(12) United States Patent
Korehisa et al.

(10) Patent No.: US 7,657,155 B2
(45) Date of Patent: Feb. 2, 2010

(54) PROGRAM DATA RECORDING METHOD AND APPARATUS

(75) Inventors: Makoto Korehisa, Kanagawa (JP); Shinichiro Sugai, Saitama (JP); Yukinori Kita, Tokyo (JP)

(73) Assignee: Sony Corporation, Tokyo (JP)

( * ) Notice: Subject to any disclaimer, the term of this patent is extended or adjusted under 35 U.S.C. 154(b) by 684 days.

(21) Appl. No.: 10/570,369

(22) PCT Filed: Sep. 3, 2004

(86) PCT No.: PCT/JP2004/013184
§ 371 (c)(1),
(2), (4) Date: Mar. 2, 2006

(87) PCT Pub. No.: WO2005/025216
PCT Pub. Date: Mar. 17, 2006

(65) Prior Publication Data
US 2007/0014533 A1    Jan. 18, 2007

(30) Foreign Application Priority Data
Sep. 4, 2003    (JP)    .............................. 2003-312882

(51) Int. Cl.
*H04N 5/91*    (2006.01)
*H04N 7/08*    (2006.01)

(52) U.S. Cl. .......................................... 386/83; 386/92

(58) Field of Classification Search ................... 386/46, 386/83, 92, 124, 123, 68
See application file for complete search history.

(56) References Cited

U.S. PATENT DOCUMENTS

| 2002/0065678 A1 * | 5/2002 | Peliotis et al. ................. 705/1 |
| 2003/0194200 A1 * | 10/2003 | Yuen et al. ..................... 386/46 |

FOREIGN PATENT DOCUMENTS

| JP | 7 303216 | 11/1995 |
| JP | 10 112838 | 4/1998 |
| JP | 2000 156835 | 6/2000 |
| JP | 2001 77771 | 3/2001 |
| JP | 2001 352517 | 12/2001 |
| JP | 2002 64771 | 2/2002 |
| JP | 2003 199007 | 7/2003 |

* cited by examiner

*Primary Examiner*—Robert Chevalier
(74) *Attorney, Agent, or Firm*—Frommer Lawrence & Haug LLP; William S. Frommer; Thomas F. Presson

(57) ABSTRACT

In order to make a recording mode in case of recording a broadcast program to be a mode which is easily used when reproducing, guide information of the broadcast program of the recorded channel is obtained in a case when a received broadcast program is recorded and a pointer is set according to the obtained guide information at a recording position of the time from which each program is started in a case when a plurality of programs exist during a period from the recording start time to the ending time thereof.

6 Claims, 15 Drawing Sheets

FIG. 14

Setup — Ground Wave Ch Confirmation

| Receiv.Ch | Disp.Ch | Name of Broadcast Station |
|---|---|---|
| 1 | 1 | TV-ABC |
| 3 | 3 | Channel-A |
| 4 | 4 | TV-X |
| 6 | 6 | AYZ-TV |
| 8 | 8 | TV-XX |
| 10 | 10 | AA-TV |
| 12 | 12 | Televi.-×× |
| 48 | 42 | TV-ZZ |

⇧ ⇩ For Select. & (Determine) For Determine. (Live) For Finish.

FIG. 15

Setup — Ch Setting for Auto. Video-Rec.

| Disp.Ch | Name of Broadcast Station | Auto.Video-Rec. |
|---|---|---|
| 1 | TV-ABC | Yes |
| 3 | Channel-A | No |
| 4 | TV-X | Yes |
| 6 | AYZ-TV | No |
| 8 | TV-XX | Yes |
| 10 | AA-TV | No |
| 12 | Televi.-×× | Yes |
| 42 | TV-ZZ | No |

⇧ ⇩ For Select. & (Determine) For Determine. (Live) For Finish.

FIG. 18

Auto. Video-Rec. Ch Intended/Non-Intended

| Receiv.Ch | Name of Broadcast Station | Auto.Video-Rec. |
|---|---|---|
| 123 | Sky-Channel | Yes |
| 223 | Family-Channel | No |
| 323 | Super-Circuit | Yes |
| 423 | Blue-Channel | No |
| 523 | Satellite Broadcast of ××-University Campus | Yes |
| 623 | Table Tennis TV 275 | No |
| 723 | Channel | Yes |
| 823 | ABC-Channel | No |

⇧ ⇩ For Select. & (Determine) For Determine. (Live) For Finish.

FIG. 19

Date And Hour of Recording
August, 20th (Wed.)
  7:00PM~9:00PM
Title List

| News |
| Always Together with You |
| Travel Asking for Living Object |
| Hour of Famous Song |

PROGRAM DATA RECORDING METHOD AND APPARATUS

TECHNICAL FIELD

The present invention relates to a program recording method and apparatus preferably used for a recording apparatus which records, for example, a broadcast program in a recording medium such as a hard disk.

BACKGROUND ART

Heretofore, a hard disk recording and reproducing apparatus which uses a hard disk as a recording medium has been be in practical use in the field of an apparatus for recording (video recording) a television broadcast. In case of this hard disk recording and reproducing apparatus, it is possible to record a television broadcast signal, for example, by a recording capacity of several ten giga-bytes for several ten hours. With respect to the recordable hours, they are assumed to increase depending upon the improvement in the recording density of the recording medium such as a hard disk and/or upon the improvement in the compression technology of the broadcast data.

In this hard disk recording and reproducing apparatus, there is an apparatus which receives electric program guide data called an EPG (Electric Program Guide) in order to perform video-recording of television programs easily. EPG data are to be added to broadcast data in case of a broadcast system such as a digital satellite broadcast and also to be sent by adding them in a specific time zone such as a blanking period of a video signal in a specific channel in case of a ground wave such as an analog broadcast. Further, there is also another system where they are signal-distributed to a user-side recording and reproducing apparatus through a transmitting means such as an internet without any connection with the transmission of the broadcast data.

An effect is obtained for users such that a video-record reservation of a desired program can be performed relatively easily by receiving the EPG data transmitted in this manner, by displaying a program table of a television broadcast on a receiver screen according to the received EPG data and by performing an operation of selecting a program which is desired to be video-recorded in the program table.

Also, it is possible to make a serial program reservation in a lump such as of serial dramas which are broadcasted, for example, at a predetermined time everyday by utilizing the program table according to the EPG data. Further, it is also possible to search a program by a preset keyword and to automatically reserve of a program which was found by that search.

In a publication of an unexamined application No. 2000-28747 published by the Japanese Patent Office, there is a description of one example of a television receiver where a video-record reservation is made by utilizing such electronic program data.

And now, in a case when recording is carried out by a broadcast program recording apparatus such as a hard disk recording and reproducing apparatus and when a picture recording reservation is carried out by utilizing electronic program data, the picture recording reservation is carried out per one program shown by the electronic program data, so that in the recorded data, recording data of one unit comes to correspond to one program. However, there is also a case as for the picture recording process using this kind of recording apparatus in which a picture recording reservation is carried out not only by the reservation picture recording process according to these kinds of EPG data but also, for example, by appointing a channel number, a picture recording start time and an ending time according to a user's preference. In addition, there is also a case in which a program on air is picture-recorded by pushing down a picture-recording start button. In such cases, a picture recording is to be carried out until a predetermined picture-recording ending time or until a user pushes down picture-recording stop button and even if a plurality of programs are broadcasted during a period from that recording start to the recording end, the recording at that time is to be recorded as a program of one unit.

Consequently, in a case when, for example, a program broadcast which a user wants to watch begins after 30 minutes from the recording start and when the program recorded at that time is to be reproduced, it is necessary to carry out a fast forward reproduction for the recording interval of approximately 30 minutes from the beginning of the program or the like so as to perform a so-called index-search operation, so that it could not be said that it was sufficiently easy-to-use.

The present invention was invented in view of such an aspect and has an object to make a recording mode in case of recording a broadcast program to be a mode in which it is easily used on an occasion of a reproducing.

DISCLOSURE OF THE INVENTION

A first invention has a constitution in a program data recording method for recording a received broadcast program such that guide information of a broadcast program in a recorded channel is obtained and stored; predetermined pointers are set at recording positions of time points on which respective programs are started in a case when a plurality of programs exist during a period from a recording start time to an ending time thereof according to the obtained guide information; and the pointers are recorded by making a connection with the guide information.

By doing like this, a pointer is to be set at a recording start position of each program according to the program guide information automatically, so that it becomes possible to set a reproduction position separately for each program which was recorded, for example, by making it possible to set a reproduction start position for each pointer separately.

A second invention has a constitution in a program data recording method of the first invention such that recording programs can be reproduced from the set positions of the respective pointers on an occasion of reproduction.

By doing like this, it becomes possible to separately set a reproduction position for each program which was recorded.

A third invention has a constitution in a program data recording method of the second invention such that also the guide information is recorded together with the program data and it is made possible to display a recording program list according to the recorded guide information.

By doing like this, it becomes possible to select a program to be reproduced easily from a displayed list.

A fourth invention has a constitution of a program data recording apparatus wherein there are provided with receiving means for receiving a broadcast signal of a predetermined broadcast service; recording means for recording the broadcast signal received by the receiving means; guide information obtaining means for obtaining and storing guide information of a program broadcasted by the broadcast service; and control means for obtaining the guide information relating to the program which is being recorded by the recording means from the guide information obtaining means, for setting predetermined pointers at recording positions of time points on which respective programs are started in a case when a plurality of programs exist during a period from a recording start time to an ending time thereof according to the obtained guide information, and for recording the pointers by making a connection with the guide information.

By doing like this, a pointer is to be set at a recording start position of each program according to the program guide information automatically, so that it becomes possible to set a reproduction position separately for each program which was recorded, for example, by making it possible to set a reproduction start position for each pointer separately.

A fifth invention has a constitution in a program data recording apparatus of the fourth invention such that the control means carries out a control for reproducing recording programs from the set positions of the respective pointers when reproducing the programs recorded by the recording means.

By doing like this, it becomes possible to separately set a reproduction position at each program which was recorded.

A sixth invention has a constitution in a program data recording apparatus of the fifth invention such that the recording means records also the guide information of the program recorded at that time together with the program data and the control means carries out a control for displaying a recording program list according to the recorded guide information.

By doing like this, it becomes possible to select a program to be reproduced easily from a displayed list.

BRIEF DESCRIPTION OF DRAWINGS

FIG. 14 is an explanatory diagram showing a display example when confirming a ground wave channel according to one exemplified example of the present invention;

FIG. 15 is an explanatory diagram showing a display example when setting an automatic video recording channel in ground wave channels according to one exemplified example of the present invention;

FIG. 18 is an explanatory diagram showing a display example when setting an automatic video recording channel in CS broadcast channels according to one exemplified example of the present invention;

FIG. 19 is an explanatory diagram showing a display example of a reproduction list according to one exemplified embodiment of the present invention;

BEST MODE FOR CARRYING OUT THE INVENTION

One exemplified example of the present invention will be explained hereinafter with reference to attached drawings.

Figure 1:
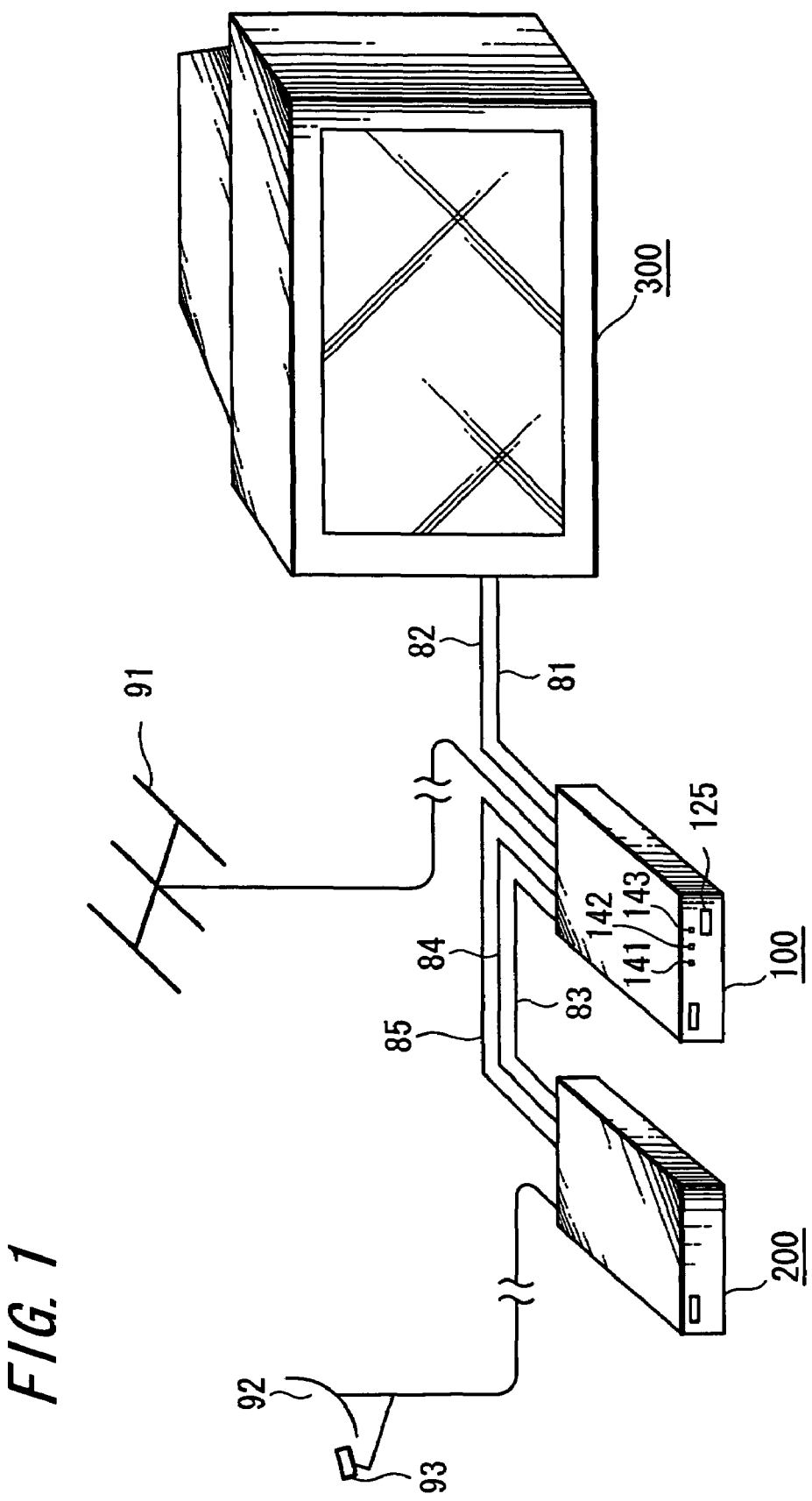
FIG. 1 is an explanatory diagram showing a system constitutional example according to one exemplified example of the present invention.

FIG. 1 is a diagram showing a system constitutional example according to the present exemplified example. In this example, it is constituted such that a hard disk recording and reproducing apparatus 100 which video-records a television broadcast and a CS tuner apparatus 200 which receives a CS broadcast are connected and further a television receiver 300 is connected thereto. The hard disk recording and reproducing apparatus 100 is constituted as a video recording and reproducing apparatus installed with a hard disk which video-records and reproduces a television broadcast program, and a tuner for receiving a television broadcast is installed in the hard disk recording and reproducing apparatus 100 and, for example, an antenna 91 for a ground wave is connected thereto. The CS tuner apparatus 200 is used as a tuner for receiving a CS broadcast and, for example, a parabola antenna 92 is connected thereto such that a received wave of the CS broadcast is supplied from a converter 93 mounted on the parabola antenna 92. The television receiver 300 is inputted with a video signal and an audio signal from the hard disk recording and reproducing apparatus 100 and it is possible to use another display apparatus such as a monitor receiver if it is means which can display the video and output the audio. With respect to the audio signal, it can be output by supplying it to another audio output apparatus other than the display apparatus.

The CS tuner apparatus 200 is constituted so as to receive two of the CS broadcast services and transmits the video signal and the audio signal of the television broadcast (CS broadcast) received by the CS tuner apparatus 200 to the hard disk recording and reproducing apparatus 100 through cables 96 and 97 respectively. It should be noted that the two of the broadcast services are from satellites which are different communication satellites which relay electric waves and forms of broadcast data are also a little bit different. In addition, the hard disk recording and reproducing apparatus 100 and the CS tuner apparatus 200 are designed to communicate bi-directionally by connecting data communication ports provided in respective apparatuses through a cable 98 such that it is possible to transmit broadcast data and the like received by the CS tuner apparatus 200 to the hard disk recording and reproducing apparatus 100.

In the hard disk recording and reproducing apparatus 100, it is possible to record a television broadcast program of the ground wave which is received by the installed ground wave tuner onto the hard disk and to record a television broadcast program of the CS broadcast which is received by the connected CS tuner apparatus 200 onto the hard disk.

In case of this example, the CS broadcast service received by the CS tuner apparatus 200 is a digital broadcast service which transmits a video signal and an audio signal formed by digital data and electronic program data called as EPG data are added to the packets for transmitting these data. The packets added with the electronic program data are transmitted to the hard disk recording and reproducing apparatus 100 from the CS tuner apparatus 200 through the data communication port.

Also, it is possible to transmit a control signal which controls the operation of the CS tuner apparatus 200 from the side of the hard disk recording and reproducing apparatus 100 by using the connection between these data communication ports. As for instructions (commands) by the control signal, there are instructions such as a power on/off instruction of the CS tuner apparatus 200, a channel change-over instruction, a changing instruction of the broadcast service to be received and a changing instruction of the operation mode. However, it becomes unnecessary to provide the changing instruction of the broadcast service to be received owing to the constitution of the connected CS tuner apparatus 200. Further, it may be possible to transmit an instruction for inquiring the present operation state of the CS tuner apparatus 200 (for example, inquiry if it is in a power-on state or in a standby state) instead of instructions which instruct operations directly.

Also, the video signal and the audio signal which the hard disk recording and reproducing apparatus 100 outputs are connected to the television receiver 300 through cables 94 and 95. In the television receiver 300, it is possible to display the video recorded on the hard disk which is installed in the hard disk recording and reproducing apparatus 100 and to output the audio. It should be noted though not shown in FIG. 1 that it is possible to connect the CS tuner apparatus 200 and the television receiver 300 directly. Further, it may be possible to connect a video signal source other than the CS tuner apparatus 200 to the hard disk recording and reproducing apparatus 100 such that the video signal and the audio signal supplied from the video signal source will be recorded onto the hard disk.

Figure 2:
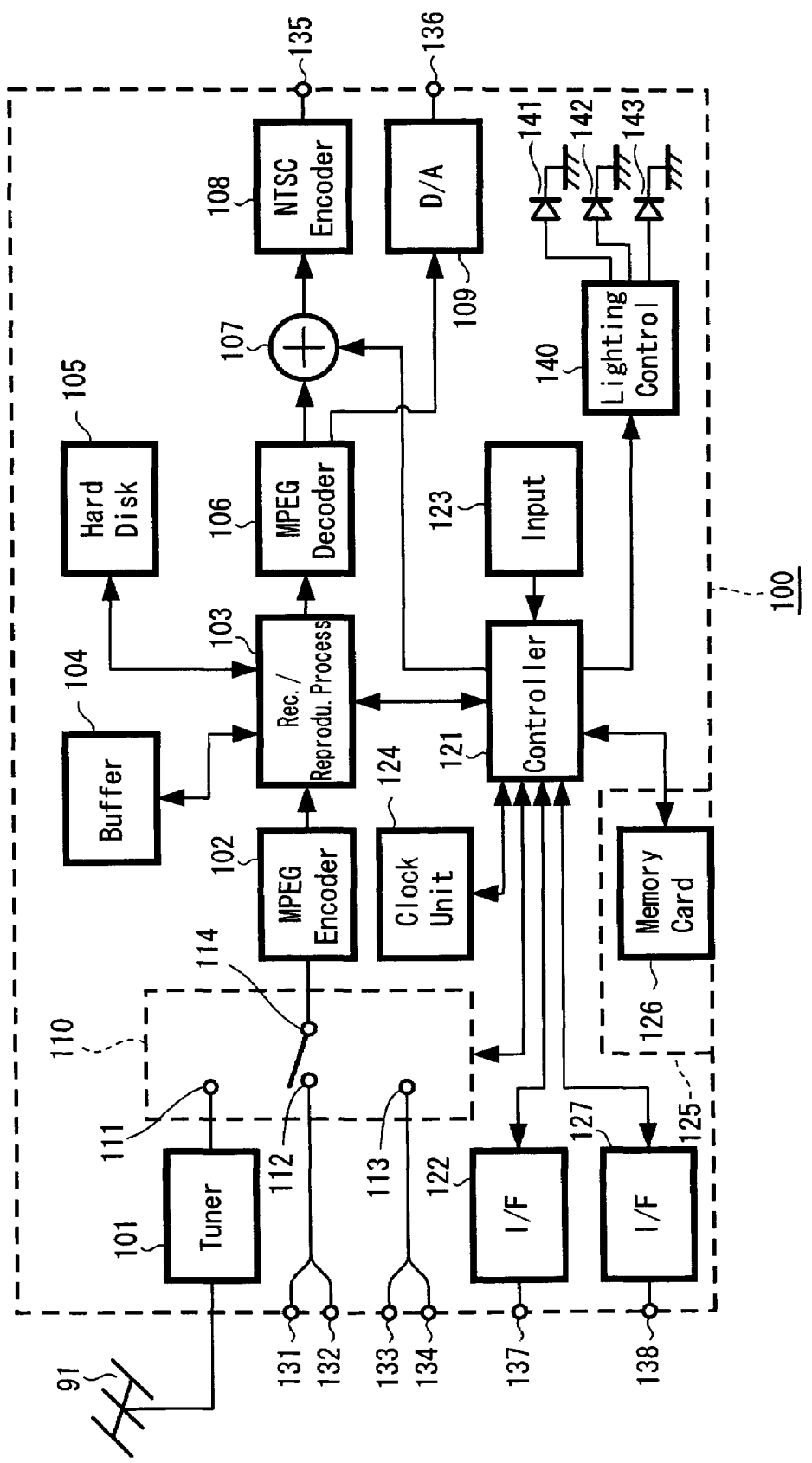
FIG. 2 is a block diagram showing a constitutional example of a hard disk recording and reproducing apparatus according to one exemplified example of the present invention.

Next, the constitution of the hard disk recording and reproducing apparatus 100 will be explained with reference to FIG. 2. The ground wave antenna 91 connected to the hard disk recording and reproducing apparatus 100 is connected to a ground wave tuner 101 installed in the apparatus 100 and the video signal and the audio signal of the ground wave television broadcast which are received and obtained by the tuner 101 are supplied to a terminal 111 of a change-over switch 110.

With respect to receiving channels for the ground wave tuner 101, they are controlled by a controller 121 of the recording and reproducing apparatus 100. The ground wave received by the tuner 101 is an analog broadcast wave and it is designed such that EPG data for displaying an electronic program table are transmitted with respect to a predetermined specific channel several times a day and at predetermined time points by superimposing data into the blanking period of the video signal and the like. The EPG data are designed to be data not only for guiding channels to which the EPG data are superimposed but also for guiding programs relating to almost all ground wave channels which are receivable in that area. Consequently, the tuner 101 has a function to operate as program data obtaining means for picking up EPG data superimposed in that channel by receiving a channel to which EPG data are superimposed (added) during the superimposed period. With respect to the EPG data received by the tuner 101, it is designed such that they are transmitted to the controller 121. The controller 121 of this example is provided with a function to operate as processing means for picking up only necessary program data from the supplied EPG data. The detailed process for picking up only necessary program data will be described hereinafter.

The change-over switch 110 is a switch for changing over the received signal of the tuner 101 and signals obtained at input terminals 131, 132, 133 and 134 from the outside. The input terminals 131 and 132 are an input terminal of a video signal and an input terminal of an audio signal which are used as a first input portion and the signals obtained at these input terminals are supplied to a terminal 112 of the change-over switch 110. The input terminal 133 and 134 are an input terminal of a video signal and an input terminal of an audio signal which are used as a second input portion and the signals obtained at these input terminals are supplied to a terminal 113 of the change-over switch 110. With respect to the video signals and the audio signals obtained at these terminals 111, 112 and 113, the signal selected by the controller 121 is obtained at a terminal 114. It should be noted in FIG. 2 that the transmission paths of the both signals are shown as only one transmission line if the supply, the change over or the like of the video signal and the audio signal is performed simultaneously.

With respect to the first input portion (input terminals 131 and 132) in the input portions from the outside, it is used as an exclusive input terminal which is supplied with the video signal and the audio signal received and outputted by the CS tuner apparatus 200. However, if the CS tuner is not connected, it is possible to connect another video signal source to this first input portion.

With respect to the second input portion (input terminals 133 and 134), a video signal source for outputting a video signal and an audio signal which are desirable to be recorded in the hard disk recording and reproducing apparatus 100 is connected. For example, a BS tuner, a video tape recording and reproducing apparatus or the like is connected.

The video signal and the audio signal selected by the change-over switch 110 (signal obtained at the terminal 114) is supplied to an MPEG (Moving Picture coding Experts Group) encoder 102 and is converted to digital video data and digital audio data which are compression-encoded, for example, by an MPEG2 system. The signal supplied to the encoder 102 is an analog signal, so that it is designed such that a digital conversion from an analog signal to digital data can be also performed in the encoder 102 (or in another individual circuit).

The video data and the audio data of the MPEG2 system which are obtained in the MPEG encoder 102 are supplied to a recording and reproducing process unit 103. The recording and reproducing process unit 103 is a circuit which performs a process for recording and reproducing video data, audio data and the like to and from a hard disk 105. A buffer memory 104 is connected to the recording and reproducing process unit 103 and it is designed such that data are temporarily stored in the buffer memory 104 and at the same time the recording and reproduction of data are performed thereto and therefrom. It should be noted that the hard disk 105 is made to be used also as a memory means (recording means) of electronic program data. More specifically, the electronic program data processed in the controller 121 are made to be recorded and reproduced to and from the hard disk 105 under the control of the controller 121. However, with respect to the electronic program data, it is possible to use a memory (not shown) connected to the controller 121 as memory means without using the hard disk 105 as memory means. With respect to the hard disk 105, it is constituted such that a head records and reproduces thereto and therefrom under a condition that a spindle motor is rotated in a high speed and it is possible to record a television broadcast signal, for example, with a recording capacity of several ten giga bytes for several ten hours.

With respect to the video data and the audio data which were reproduced from the hard disk 105 and processed in the recording and reproducing process unit 103, they are supplied to a MPEG decoder 106 and a decoding from the MPEG2 system is performed. With respect to the decoded video data, they are supplied to an NTSC encoder 108 through a mixer 107 and supplied to an output terminal 135 as an analog video signal of the NTSC system. With respect to decoded audio data, they are converted to an analog audio signal in a digital/analog converter 109 and the analog audio signal is supplied to an output terminal 136. These output terminals 135 and 136 correspond to the terminals connected to the television receiver by means of cables 94 and 95 in FIG. 1.

Also, the hard disk recording and reproducing apparatus 100 of this example is provided with a data communication port 137 for performing a communication with the CS tuner apparatus 200. It is constituted such that data which are necessary for an interface 122 are picked up at this data communication port 137 from the data transmitted from the CS tuner apparatus 200 side and transmitted to the controller 121. There are, for example, electronic program data as data transmitted from the CS tuner apparatus 200 side to the recording and reproducing apparatus 100. Further, data (various instructions, etc. mentioned in the explanation of FIG. 1) which are desirable to be transmitted from the controller 121 to the CS tuner apparatus 200 side are made to be outputted from the data communication port 137 through the interface 122.

With respect to instructions for operating the hard disk recording and reproducing apparatus 100, it is constituted such that they are supplied from an input unit 123 which is composed of operation keys, a remote control signal receiving portion (light receiving portion) and the like. If, for example, an operation instruction reaches the input unit 123 from a remote control device (not shown) by means of an infrared signal, the received instruction is transmitted to the controller 121. With respect to instructions by the remote control device, the key operations and the like, there are instructions, for example, other than instructions which directly instruct video recording, reproducing, channel changing over and the like, such as an operation instruction of a so-called GUI (Graphical User Interface) where a multi functional operation is performed by operating a cursor key, a decision key and the like with reference to the display of the receiver 300 connected to the hard disk recording and reproducing apparatus 100.

When a process of forming a picture for the GUI operation is performed, the controller 121 transmits the formed picture data to the mixer 107 so as to mix with the video data outputted from the MPEG decoder 106 and the video signal outputted from the output terminal 135 is made to be a video signal which can display a corresponding picture.

When it is necessary to perform various displays other than the picture for the GUI operation by using the hard disk recording and reproducing apparatus 100, the controller 121 is similarly made to form their display picture data and transmits them to the mixer 107. It will be described hereinafter with respect to examples of the pictures displayed by these processes.

Also, a clock unit 124 is connected to the controller 121 and the result counted by the clock unit 124 with respect to the present time (year/month/day, time/minute/second) is made to be judged in the controller 121 when needed. The date and hour counted by the clock unit 124 are judged in the controller 121 and the execution of a reserved video-record and the like will be carried out therein. With respect to the time counted by the clock unit 124, In case of this example, it is constituted such that time is automatically corrected according to a signal received by the connected CS tuner apparatus 200. it will be described later with respect to the automatic time correction process.

Further, the hard disk recording and reproducing apparatus 100 of this example is equipped with three light emitting diodes 141, 142, 143 as lighting means at the front panel portion of the apparatus and it is designed such that the lighting of these three light emitting diodes 141 to 143 is controlled individually by the drive of the lighting control unit 140 according to the control of the controller 121. The three light emitting diodes 141 to 143 are designed such that, for example, the colors of the emitting lights thereof are different one another. In case of this example, the light emission of the three light emitting diodes 141 to 143 is used as means for notifying a fact when a new video record (specifically, series reservation) is made.

In addition, the hard disk recording and reproducing apparatus 100 of this example is provided with card slot 125 to which a memory card is attachable detachably and it is designed such that various processes can be performed through the controller 121 by reading-out data stored in a memory card 126 which is loaded into the card slot 125. If, for example, still picture data or moving picture data are stored in the loaded memory card 126, the video data are readout by the controller 121 and transmitted to the mixer 107 side, and it is possible to display them on the receiver 300 connected to the recording and reproducing apparatus 100. Alternatively, it is possible to record the data readout from the memory card 126 to the hard disk 105 and the like.

Further, the hard disk recording and reproducing apparatus 100 of this example is provide with a port 138 to be connected to the internet and it is designed such that the exchange of data through communication means connected by means of the port 138 for the internet connection can be carried out by the controller 121 through an interface 127.

With respect to the port 138 for the internet connection, it is designed such that it can be connected, for example, with a router or a modem for the internet connection through a predetermined cable. It is also possible to obtain electronic program data by accessing the server of a predetermined address through the port 138 for the internet connection.

When electronic program data are obtained through various processes, the controller 121 saves the electronic program data in a partial area of the hard disk 105 such that a display process of an electronic program table, a video-record reservation process or the like is performed by utilizing the saved data. As to electronic program data obtained by the controller 121, there are three kinds of data composed of electronic program data received by the built-in tuner 101, electronic program data obtained from the connect CS tuner apparatus 200 through the port 137 and electronic program data obtained through the internet where it is determined beforehand which electronic program data will be used.

It should be noted that a nonvolatile memory (not shown) is connected to the controller 121 and various setting matters are to be stored therein. In addition, information of video-record reservations is also stored in the nonvolatile memory. However, it is possible to use a partial recording area of the hard disk 105 instead without providing a nonvolatile memory.

Figure 3:
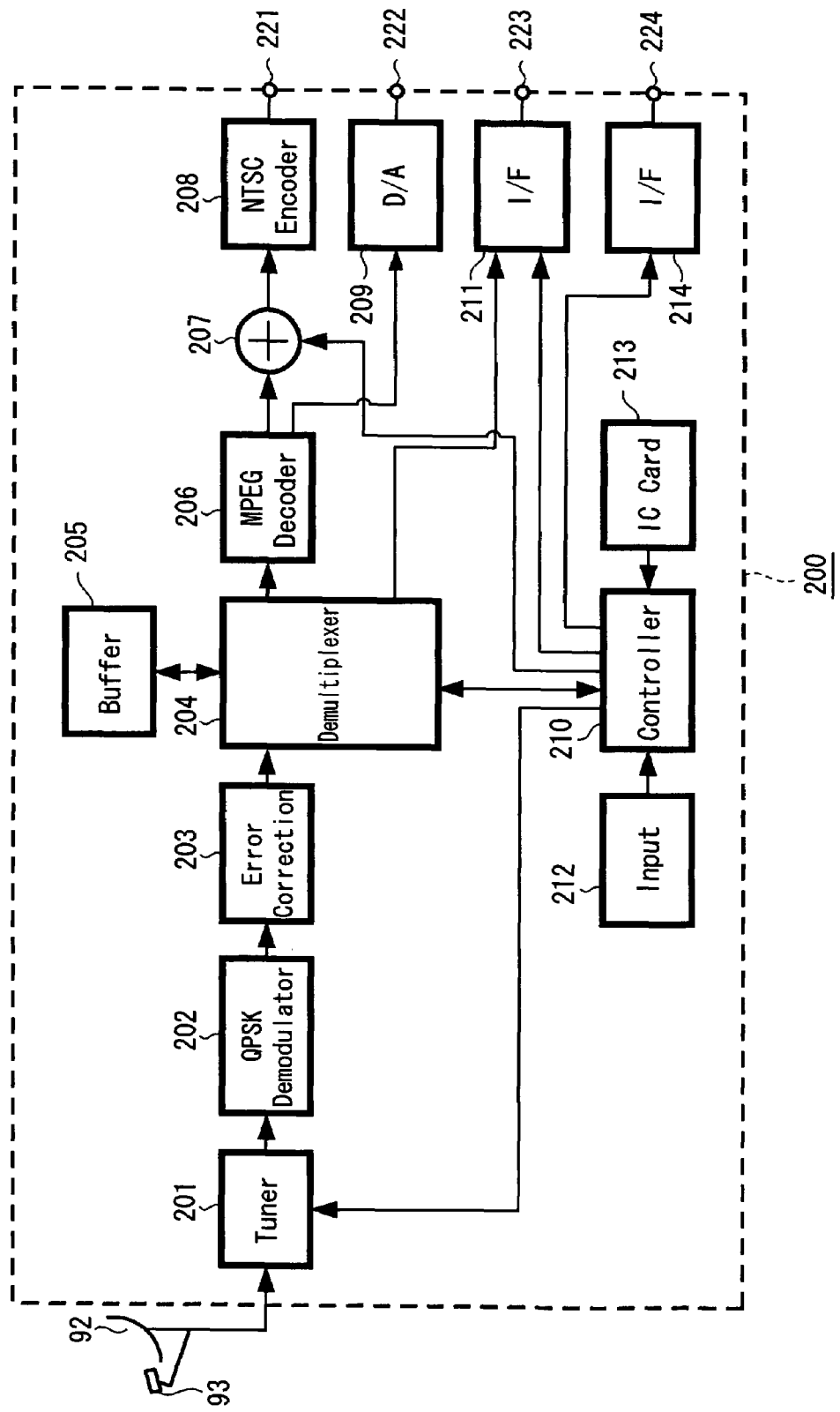
FIG. 3 is a block diagram showing a constitutional example of a tuner apparatus according to one exemplified example of the present invention.

Next, a constitution of the CS tuner apparatus 200 connected to the hard disk recording and reproducing apparatus 100 according to this example will be explained with reference to FIG. 3.

The parabola antenna 92 which receives a satellite broadcasting wave is connected to the CS tuner apparatus 200 and packets in which received channel data are included are receiving-processed in the tuner 201 with respect to the signal which is supplied from the converter 93 of the parabola antenna 92. The selection of the received packets is controlled by a controller 210. The packets received by the tuner 201 are supplied to a QPSK (Quadrature Phase Shift Keying) demodulator unit 202 and data of the received packets are QPSK-processed. The demodulated data are supplied to an error correction unit 203 and an error correction process is performed.

The error corrected received data are supplied to a demultiplexer 204 and video data, audio data and other data of the receive channel are picked up from the received packets. There are, for example, electronic program data as other data. This picking up process is executed according to a control of the controller 210 and it is designed such that a temporal store of necessary data for the data processing is performed by a buffer memory 205 connected thereto.

The video data and audio data picked up in the demultiplexer 204 are supplied to an MPEG decoder 206 and the video data and audio data which are encoded by the MPEG2 system are decoded therein. The video data decoded in the MPEG decoder 206 are supplied to an NTSC encoder 208 through a mixer 207 and supplied to an output terminal 221 as an analog video signal of the NTSC system. With respect to the decoded audio data, they are converted to an analog audio signal in a digital/analog converter 209 and the analog audio signal is supplied to an output terminal 222. These output terminals 221 and 222 correspond to the terminals connected to the hard disk recording and reproducing apparatus 100 through cables 96 and 97 in FIG. 1. With respect to the electronic program data picked up in the demultiplexer 204, they are made to be transmitted to a controller 210.

With respect to the video signal outputted from the terminal 221, there is a case that it is a video signal composed of a picture for various guide displays which are formed in the controller 210. More specifically, it is constituted such that video data for a guide display formed in the controller 210 are supplied to the mixer 207 and superimposed to the video data outputted from the MPEG decoder 206 so as to supply them to the NTSC encoder 208. As to the picture data for the guide display, there are, for example, video data for displaying an electronic program table according to the electronic program data added to the received channel signal.

Also, the CS tuner apparatus 200 of this example is provided with a data communication port 223 for performing a communication with the hard disk recording and reproducing apparatus 100. The data communication port 223 is connected to the data communication port 137 of the hard disk recording and reproducing apparatus 100 side by means of an exclusive cable (cable 98 shown in FIG. 1). The broadcast data to be transmitted by using the data communication port 223 are transmitted from the demultiplexer 204 to an interface 211 and outputted from the interface 211 in the data form to be outputted from the port 223. It is designed according to this example such that packets which are included in the received broadcast data themselves (more specifically, data including video data, audio data, EPG data, etc.) are transmitted from the port 223 to the hard disk recording and reproducing apparatus 100 side. It is designed such that only EPG data are picked up from the transmitted packet data on the side of the hard disk recording and reproducing apparatus 100.

Also, it is designed such that when the interface 211 receives data (various instructions, etc.) transmitted from the hard disk recording and reproducing apparatus 100 side through the data communication port 223, these data are to be transmitted to the controller 210. There is also a case that data are transmitted to the side of the hard disk recording and reproducing apparatus 100 from the controller 210 through the interface 211.

With respect to instructions operated in the CS tuner apparatus 200, it is constituted such that they are supplied from an input portion 212 composed of operation keys and a receiving portion (light receiving portion) of a remote control signal. If, for example, an operation instruction reaches the input portion 212 from a remote control device which is not shown by means of an infrared signal, the received instruction is transmitted to the controller 210.

Further, the CS tuner apparatus 200 is constituted such that an IC card 213 which retains data relating to reception contracts such as user registration information and viewing and listening records will be loaded thereto, and it is designed such that the controller 210 will perform a process of receiving pay channels and the like according to the information stored in the IC card 213. It is controlled with respect to a pay channel or program for which a reception contract was not made according to the stored information of the IC card 213 such that the descrambling of the channel program is not carried out even if it is channel-selected.

Further, the CS tuner apparatus 200 is provided with a connection terminal 224 of a telephone line and it is possible to transmit data to the side of the telephone line connected to the terminal 224 from the controller 210 through an interface 214. With respect to the data transmitted through the telephone line, there are data relating to reception contracts such as viewing and listening records of pay channels.

It should be noted as already explained that it is possible for the CS tuner apparatus 200 of this example to receive two of broadcast services (service A and service B) and the satellites for reception become different for respective broadcast services where in a case when the situation is changed from a state of receiving a channel of a service A to a state of receiving a channel of a service B (or in a converse case), there exist two types of tuners from the constitutional point of view of the tuner, that is, a type of tuner in which channel changing over operation is necessary after performing satellite changing over operation and a type of tuner in which the broadcast service is changed over automatically only by the channel changing over operation. The types of tuners in which satellite changing over operation is necessary exist many in relatively old types of tuners.

Next, it will be explained about a process for performing recording (video recording) and reproduction in the hard disk recording and reproducing apparatus 100 where the hard disk recording and reproducing apparatus 100 and the CS tuner apparatus 200 having constitutions explained above are connected as shown in FIG. 1 with reference to flowcharts of FIG. 4 to FIG. 10 and display examples shown in FIG. 11 and subsequent figures. It is assumed that user operations for performing these processes are executed, for example, by a remote control device (not shown) attached to the hard disk recording and reproducing apparatus 100. Specifically, it is designed such that the input of each item is performed by the operation of a cursor key, a determination key or the like of a remote control device in a condition that the video (video for GUI operation) outputted from the output terminal 135 of the hard disk recording and reproducing apparatus 100 is displayed on the television receiver 300. Display examples shown in FIG. 11 and subsequent figures are examples of pictures for this GUI operation.

As to the video recording of the broadcast program in the hard disk recording and reproducing apparatus 100 according to this example, as already explained, there are a video recording of a program of a ground wave television broadcast received by the tuner 101 installed in the recording and reproducing apparatus 100 and a video recording of a program of a CS broadcast wave television broadcast received by the CS tuner apparatus 200. In order to perform the video recording of these broadcast programs, firstly a setup is necessary in the hard disk recording and reproducing apparatus 100. The setup process is executed by the control of the controller 121 and with respect to the set up matters, they are stored (recorded) in a nonvolatile memory (not shown), a hard disk or the like connected to the controller 121.

Figure 4:
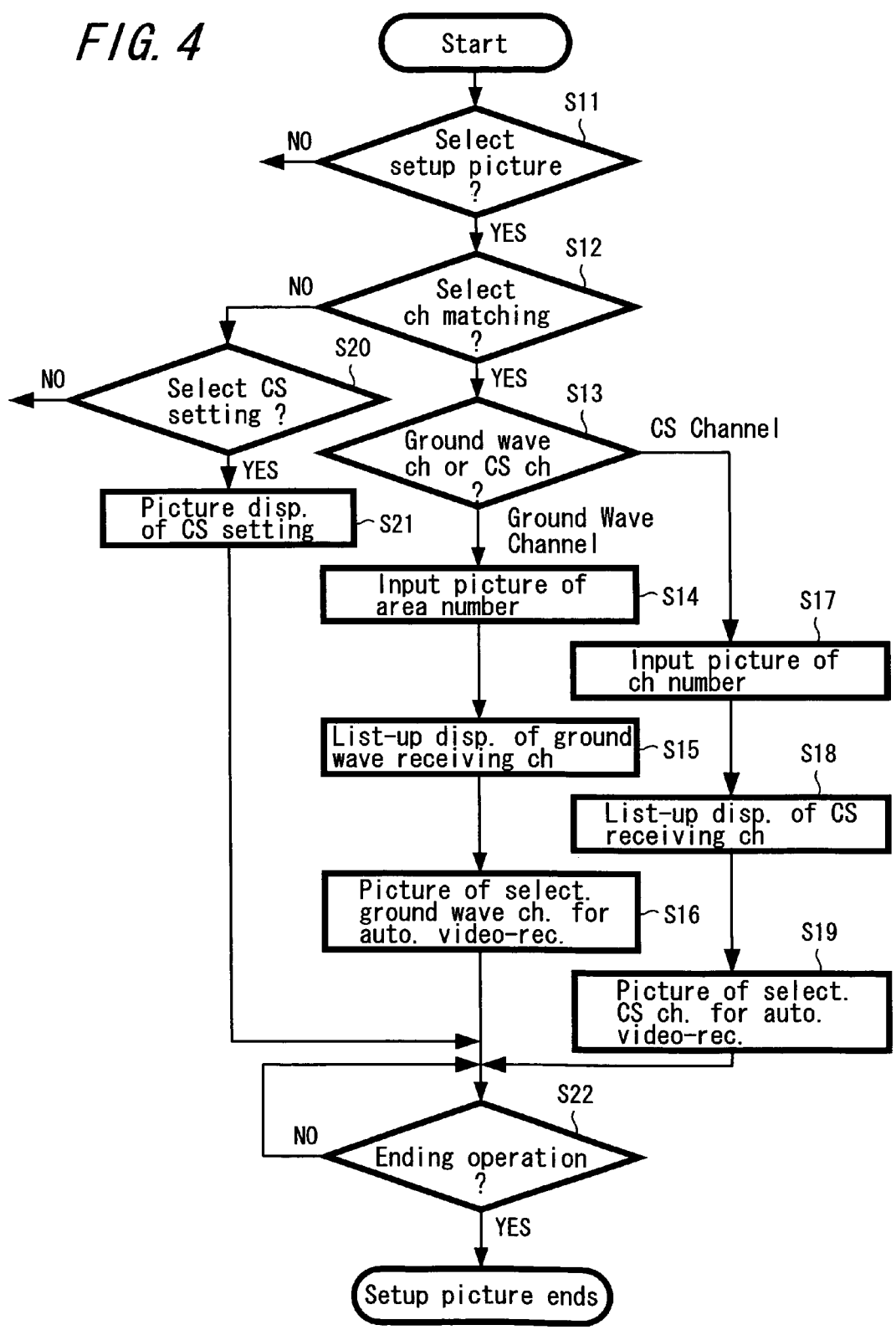
FIG. 4 is a flowchart showing a setup processing example according to one exemplified example of the present invention.

FIG. 4 is a flowchart showing one example of the setup process. First, the controller 121 of the hard disk recording and reproducing apparatus 100 judges whether or not the user operation is a selection for displaying a setup picture (step S11). At this time, if the display of the setup picture is not selected, the flow shifts to another process. If the display of the setup picture is selected, the setup picture is made to be displayed. In addition, in case of an initial setting, it is possible to make a setup picture displayed automatically in cooperate with the application of power to the hard disk recording and reproducing apparatus 100.

Figure 11:
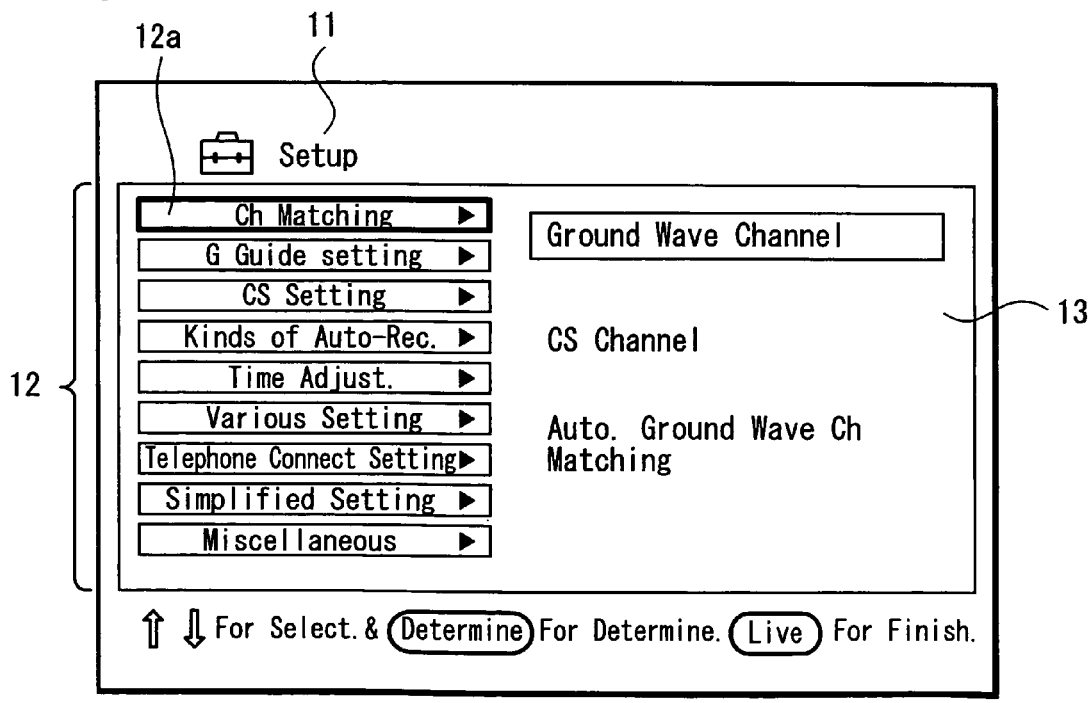
FIG. 11 is an explanatory diagram showing a display example of a setup menu according to one exemplified example of the present invention.

FIG. 11 shows a first display example of this setup picture and a menu for performing a setup is displayed. More specifically, as shown in FIG. 11, there is a display 11 designating "setup" on the upper side of the picture screen and there is a display 12 of a setup menu on the left side. Here, a state is shown where a display 12a of the channel matching is selected from the menu and a display 13 of items for performing the channel matching is made on the right side according to the state that the display 12a of the channel matching is selected.

In a condition that the setup picture is displayed, it is judged whether or not the channel matching is selected from the setup menu displayed on the picture screen (step S12). If the channel matching is selected, either one of the channel matching to the ground wave and the channel matching to the CS channel is further selected (step S13).

Under a condition that the display 12a of the channel matching is selected as shown in FIG. 11, three items of <ground wave channel>, <CS channel> and <automatic channel matching to ground wave> are displayed as the display 13 of items for the channel matching.

Figure 13:
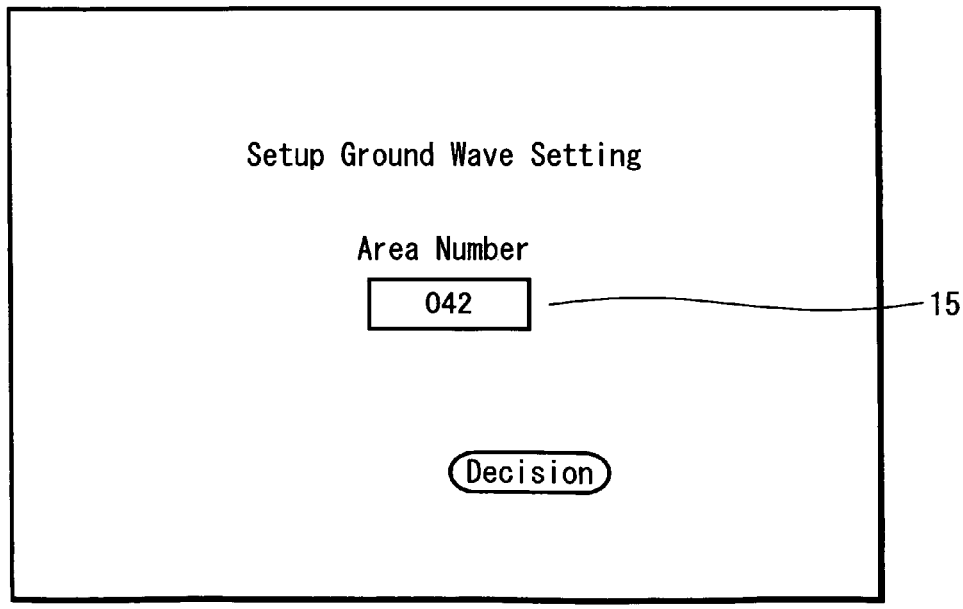
FIG. 13 is an explanatory diagram showing a display example when setting a ground wave channel according to one exemplified example of the present invention.

Here, if the channel setting of the ground wave is selected, a picture is displayed where a code number (area number) allotted to each area which is installed with this system is to be imputed by the user operation and the area number is made inputted on that picture screen (step S14). FIG. 13 is a diagram showing an example of an input picture screen for the area number and there is prepared a display area 15 for inputting the area number.

If an area number is inputted into the display area shown in FIG. 13, a list of ground wave television broadcast channels which can be received in that area is made to be displayed on the picture screen (step S15). It should be noted that with respect to the data of channel numbers and broadcasting station names of receivable channels for each area number, they are stored beforehand in a memory or the like connected to the controller 121 of the hard disk recording and reproducing apparatus 100.

FIG. 14 is one example of a confirming picture screen of the receiving channels which is displayed according to the input of the area number. Here, it is made to perform a list-up display 16 of the receiving channel numbers, a list-up display 17 of displayed channel numbers and a list-up display 18 of broadcasting station names. It is possible to change the channel number which is displayed actually on the picture screen when receiving by means of the receiving number by changing the channel number in the list-up display 17. As it is possible to change in this manner, it becomes possible to make the channel number displayed in case of receiving so-called satellite station coincide with the channel number which users remember. It should be noted that in case of the ground wave, channels for transmitting EPG data are only specific channels which are predetermined for each area and if a channel setting is performed by inputting the area number, the receiving channel number for obtaining the EPG data is also made to be set to the corresponding channel number automatically according to the data prepared beforehand.

As shown in FIG. 14, users confirm the list-up display of the receiving channels displayed and if it is satisfied, the flow shifts to a next process. If users confirm the list-up display of the receiving channels and want to add a channel as a receivable channel or to cancel a channel, corresponding user operations are performed. It should be noted that it is not shown in the flowchart of FIG. 4, but it is possible to select the registration channels station by station according to the user operation other than the input of the area number which is shown in step S14. On this registration of station by station, it is also necessary to register the channel for obtaining EPG data of the ground wave by the user operation.

The receiving channel selected by the processes until this point becomes the ground wave channel which can be received by the tuner 201 under the control of the controller 121. More specifically, if, for example, a channel up key or a channel down key of a remote control device is operated, the receiving channels will be changed in the order of channel numbers and the like among the selected receiving channels.

Then, when the channel setting for receiving the ground wave is finished, a picture for selecting a channel to be registered as a channel for which an automatic video-recording is performed among the receiving channels is displayed (step S16). The automatic video record here is a process for judging the electronic program data of the broadcast channel by the controller 121 so as to search out a program which coincides with the predetermined condition and for performing a video-record reservation of the searched out program automatically. With respect to the predetermined condition, there is, for example, a process for reserving the video-record of the program automatically and for video-recording the program onto the hard disk automatically when a specific keyword is included in a program name or in a program guiding sentence shown by electronic program data.

FIG. 15 is a diagram showing an example of a setting picture screen of an automatic video-recording channel of the ground wave. According to this example, it is designed such that a list-up display 19 of display channel numbers, a list-up display 20 of broadcasting station names and a setting display 21 of the automatic video record for each channel are to be made. The setting can be done for each channel independently by carrying out the selection of the operation relating to the display of each channel whether or not the automatic video record will be done in the setting display 21 of the automatic video record.

With respect to a channel selected as a channel for carrying out an automatic video record in the receiving channels according to the display in step S16, the controller 121 carries out the video-record reservation of the program automatically when a program which conforms to a definite condition is found out according to an appoint of a keyword and the like. Also, with respect to a channel selected as a channel for not carrying out an automatic video record in the receiving channels according to the display in step S16, such an automatic video recording process is not performed. With respect to a channel which is not selected as an automatic video recording channel, it is possible to video-record by a user operation (here such a video recording is referred to as a manual video recording for distinguishing from an automatic video recording).

Also in step S13, if it is selected as a channel setting of a CS channel, the controller 121 makes an input picture of the receiving channel numbers to be displayed and receiving channel numbers will be inputted on that input picture screen by a user operation. According to the hard disk recording and reproducing apparatus 100 of this example, it is designed such that it is possible to set maximum 20 channels as channels which can direct the reception thereof from this apparatus to the side of the CS tuner apparatus 200. It is possible to choose these 20 channels mixed up from the two broadcast services which can be received by the CS tuner apparatus 200.

Figure 16:
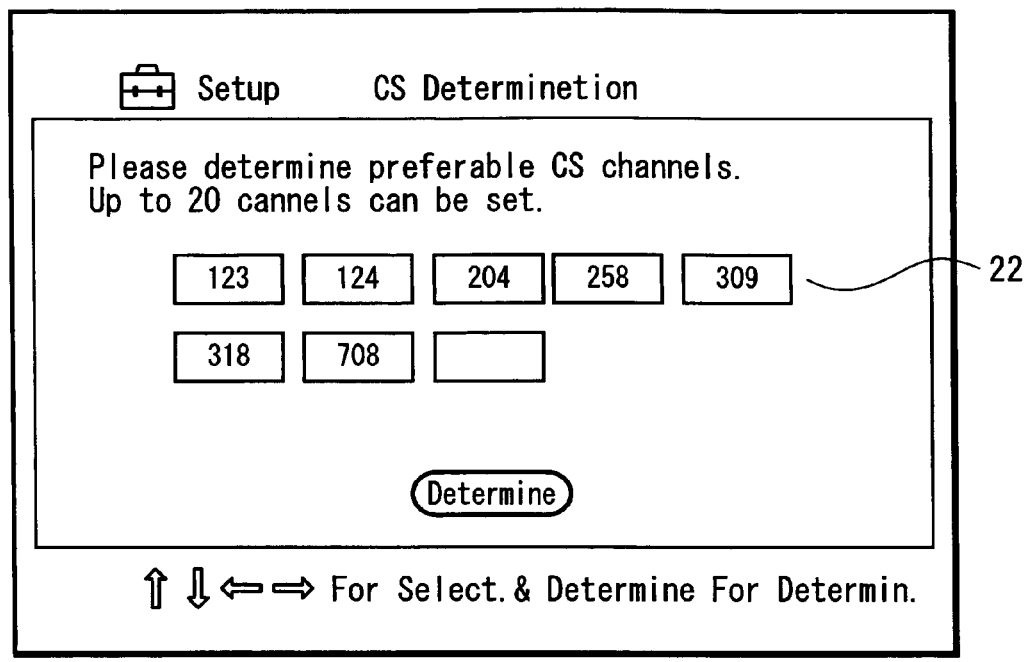
FIG. 16 is an explanatory diagram showing a display example when setting a CS broadcast channel according to one exemplified example of the present invention.

FIG. 16 is an example of an input picture screen relating to the channel numbers of the CS channels. According to this example, it is designed such that a display 22 of an area into which a channel number can be inputted will be displayed sequentially one by one and the number of the display 22 area is increased whenever the input of one channel number is finished so as to input maximum twenty of channel numbers. According to the example of FIG. 16, it is shown such that each channel number is a triple-digit number.

When the input of channel numbers is carried out and the decision operation is performed in step S17, a list of the broadcasting station names of the channel numbers inputted is made to be displayed (step S18). With respect to the correspondence of these channel numbers and the broadcasting station names, it is possible to memorize it beforehand in the hard disk recording and reproducing apparatus 100, but it is also possible to obtain it according to the data received by the connected CS tuner apparatus 200. The receiving channels of the CS broadcast displayed by a list of step S18 become channels which can be reserved for video recording according to the electronic program data in the hard disk recording and reproducing apparatus 100 of this example.

Figure 17:
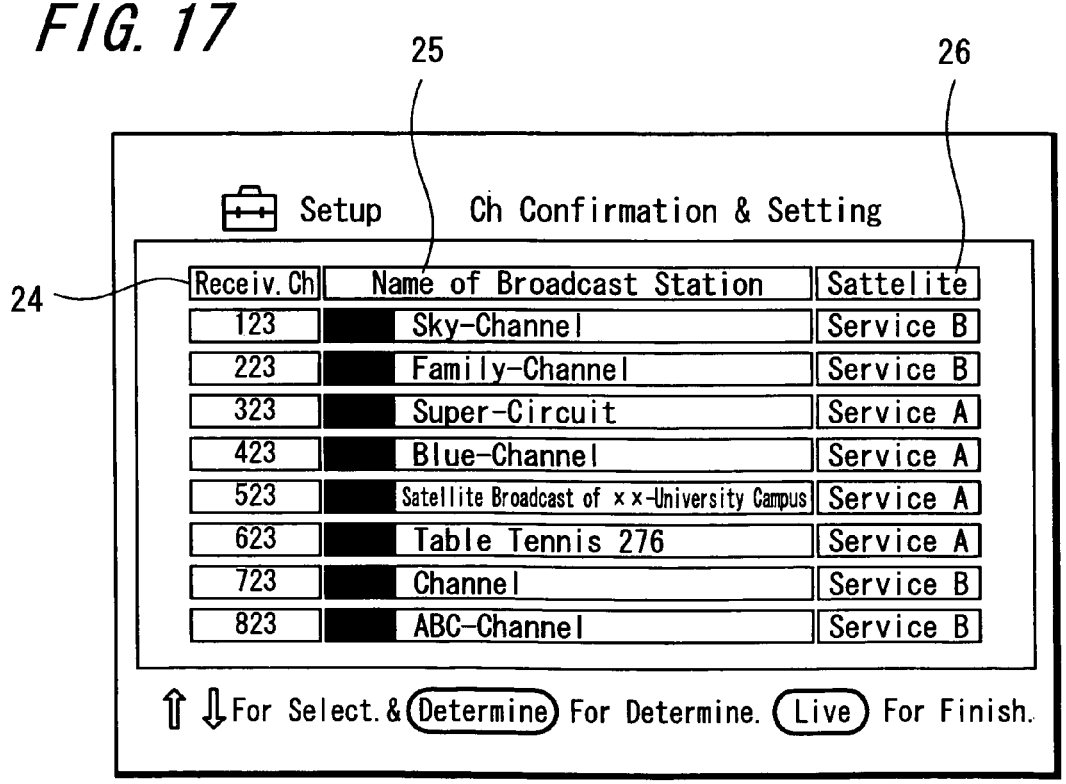
FIG. 17 is an explanatory diagram showing a display example when confirming a CS broadcast channel according to one exemplified example of the present invention.

FIG. 17 is a display example of listed up broadcasting station names of the CS channel numbers. Here, a list-up display 24 of receiving channel numbers, a list-up display 25 of corresponding broadcasting station names and a list-up display 26 of broadcast services are made to be displayed. As already explained, there are two kinds of services (referred to as service A and service B here) in the broadcast services which can be received by the CS tuner apparatus 200 according to this example and communication satellites which transmit (relay) electric waves are different from broadcast service by broadcast service.

When users confirm the list-up display of the receiving channels of the CS broadcast in step S18, a picture screen for selecting a channel to be registered as a channel for which an automatic video recording is performed in the CS broadcast receiving channels will be displayed next (step S19). The automatic video recording here is same as the automatic video record of the ground wave and it is a process for judging the electronic program data of the broadcast channel by the controller 121 so as to search out a program which coincides with the predetermined condition and for performing a video-record reservation of the searched out program automatically.

FIG. 18 is a display example of a channel setting for an automatic video recording relating to CS channels. Here, it is designed such that a list-up display 27 of receiving channel numbers, a list-up display 28 of corresponding broadcasting station names and a setting display 29 of an automatic video recording for each channel are to be displayed. The setting can be done for each channel independently by carrying out the selection of the operation relating to the display of each channel whether or not the automatic video record will be done in the setting display 29 of the automatic video record.

With respect to a channel selected as a channel for carrying out an automatic video record in the receiving channels according to the display in step S19, the controller 121 carries out the video-record reservation of the program automatically when a program which conforms to a definite condition is found out according to an appoint of a keyword and the like. Also, with respect to a channel selected as a channel for not carrying out an automatic video record in the receiving channels according to the display in step S19, such an automatic video recording process is not performed. With respect to a channel which is not selected as an automatic video recording channel, a manual video recording for selecting a program to be video-recorded is possible by the user operation while the electronic program table is made to be displayed.

Also in step S12, if it is judged that an item other than the channel matching is selected from the setup picture, it is judged whether or not a setting (but other than a channel setting) is selected with reference to the receiving of the CS broadcast (step S20) and in case of a reception setting of the CS broadcast, a picture screen for inputting corresponding items is made to be displayed (step S21).

Figure 12:
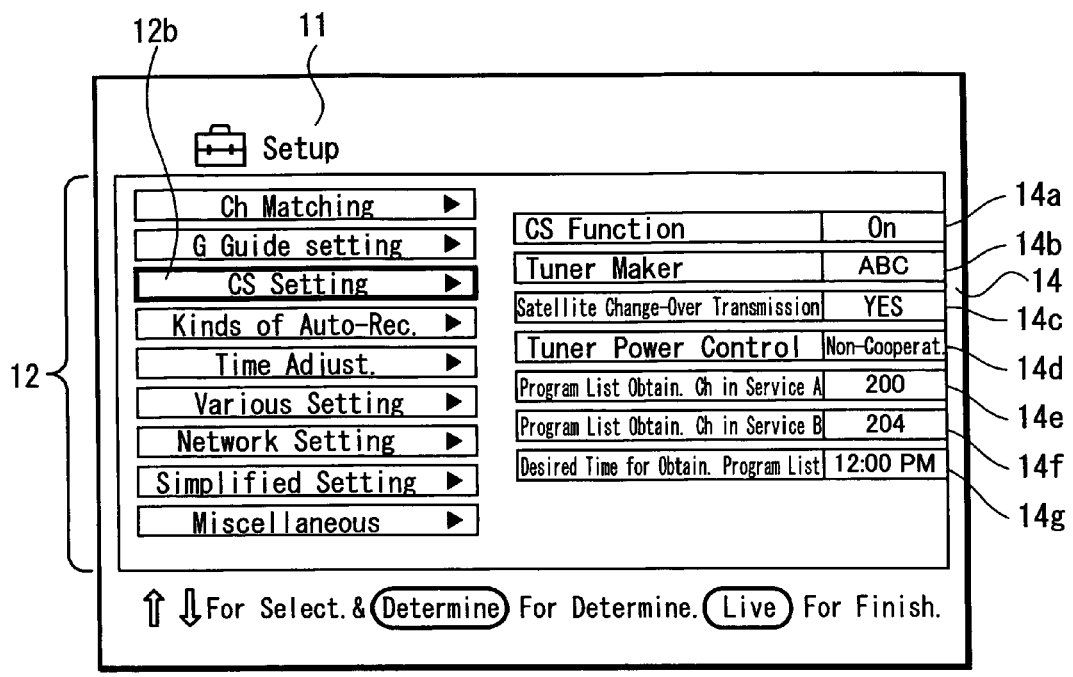
FIG. 12 is an explanatory diagram showing another display example of a setup menu according to one exemplified example of the present invention.

FIG. 12 is a display example of a setup menu relating to a reception setting of the CS broadcast. In this example, a case in which a CS setting display 12b is selected in the menu display 12 is shown and a detailed list-up display 14 relating to the CS setting is made on the right side of the picture screen. To explain the detailed list-up display 14 sequentially, there are displayed an on/off display 14a of a CS function, a display 14b of a manufacturing maker name of the connected CS tuner apparatus 200, an on/off display 14c of the satellite change-over transmission, a display 14d of cooperating or non-cooperating with the tuner power control, a display 14e of an EPG data obtaining channel number for displaying an electronic program table in service A, a display 14f of an EPG data obtaining channel number for displaying an electronic program table in service B and a display 14g of desired time for obtaining the EPG data.

It is possible to make a setting state preferable for uses by selecting each display item and performing an operation for changing it in a condition that the reception setting picture of the CS broadcast is displayed as shown in FIG. 12. To explain each of concrete items, it becomes possible to control the connected CS tuner by making the CS function "ON" and it becomes a state not performing such a control by making it "OFF". It becomes possible to control the operation of the CS tuner correctly by setting the manufacturing maker name of the connected CS tuner apparatus 200 correctly with respect to the display 14*b* of the manufacturing maker name of the connected CS tuner apparatus 200.

If a channel change over is carried out to a channel of a different CS broadcast service by setting "on" with respect to the on/off display 14*c* of the satellite change-over transmission, a satellite changing instruction is transmitted to the CS tuner apparatus 200 and thereafter an instruction of a channel number is to be transmitted. If it is set as "OFF", the satellite changing instruction is not transmitted even in a case that a channel change over to a channel of a different CS broadcast service is performed and an instruction of a channel number is to be transmitted directly. It should be noted that in a case when the satellite changing instruction is outputted, it is necessary to take an interval of several seconds after the satellite changing instruction is outputted until an instruction of a channel number is transmitted.

In a case when "cooperation" is set relating to the display 14*d* of cooperating or non-cooperating with the tuner power control, the power supply of the CS tuner apparatus 200 is made to be an on state only when it is necessary for the hard disk recording and reproducing apparatus 100 to operate the CS tuner apparatus 200 and it is made to be an off state (alternatively, a standby state) in other cases. In a case when "non-cooperation" is set, the power supply control of the CS tuner is not carried out by the hard disk recording and reproducing apparatus 100. Consequently, if a video-record reservation of the CS channel and the like are performed after setting "non-cooperation", it is necessary to make the power supply of the CS tuner apparatus 200 always on state.

With respect to a display 14*e* of an EPG data obtaining channel number for displaying an electronic program table in service A, a display 14*f* of an EPG data obtaining channel number for displaying an electronic program table in service B, they are made to be preset to channel numbers which can obtain electronic program data in the best condition in respective services. In case this example, channel numbers of promotional channels which are is prepared for respective services are to be set at the time of shipment of the hard disk recording and reproducing apparatus 100. However, it is possible for the channel numbers of the promotional channels to be changed and in such a case, user inputs for performing the change of the channel numbers displayed in the display 14*e* or the display 14*f*.

With respect to the display 14*g* of the desired time for obtaining the EPG data, the time starting for obtaining the EPG data of the CS channel is made to be displayed. It is fundamentally possible at anytime to obtain the EPG data of the CS channel if it is within the time when the broadcast service is carried on, but it is necessary relatively a long time to obtain the EPG data and it is necessary to make the obtaining time of the EPG data not overlap with the time reserved for the video recording as much as possible, so that it is fundamentally preferable to set the time during the time when there is few possibility that programs necessary for the users are transmitted.

It should be noted though an example of a picture screen is not shown that it is designed such that the setting (change) can be performed by displaying the obtaining time on a setting picture screen of the ground wave broadcast also with respect to the EPG data of the ground wave. However, the ground wave EPG data are made to be transmitted only several times a day at the time points predetermined beforehand in the present circumstances, so that it is designed such that they can be selected from only the several times of the transmission time. It is also designed such that with respect to the time zone which can be set as the EPG data of the CS channel, it is avoided from overlapping with the time zone for obtaining the EPG data of the ground wave.

Figure 5:
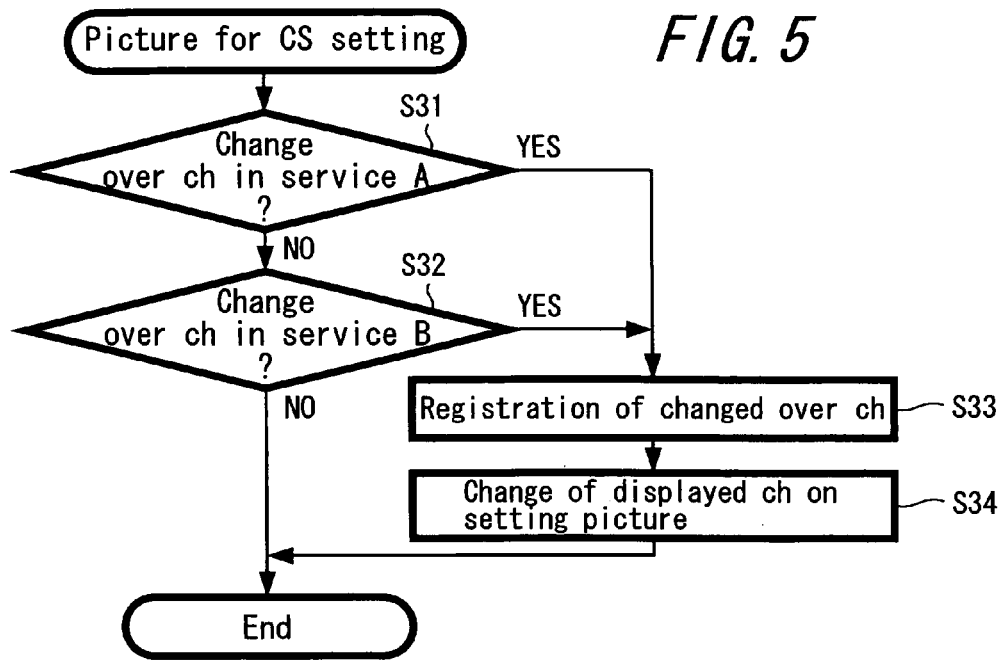
FIG. 5 is a flowchart showing a channel change processing example for obtaining a program table according to one exemplified example of the present invention.

Here, a processing example in the controller 121 in a case when the displays 14*e* and 14*f* of channel numbers for obtaining the EPG data shown in the display example of FIG. 12 are changed will be explained with reference to a flowchart of FIG. 5. First, it is judged whether or not an input for changing the channel for obtaining the EPG data in the service A in a condition that the setup menu shown in FIG. 12 is displayed (step S31) and if a corresponding input does not exist, it is judged whether or not an input for changing the channel for obtaining the EPG data in the service B (step S32). If there is an input for changing the channel for obtaining the EPG data of either one of the services, the changed channel number is registered as a channel to be received when obtaining the EPG data in the corresponding service and stored in the nonvolatile memory or the hard disk (step S33), and the channel number displayed as the display 14*e* or 14*f* will be made to be changed to that registered channel number (step S34).

In this manner, it can be easily dealt with by means of the user operation even if channel numbers and the like of the promotional channels are changed on the side of the broadcast service according to the constitution where the channel numbers for obtaining the data of the electronic program table can be changed.

Figure 6:
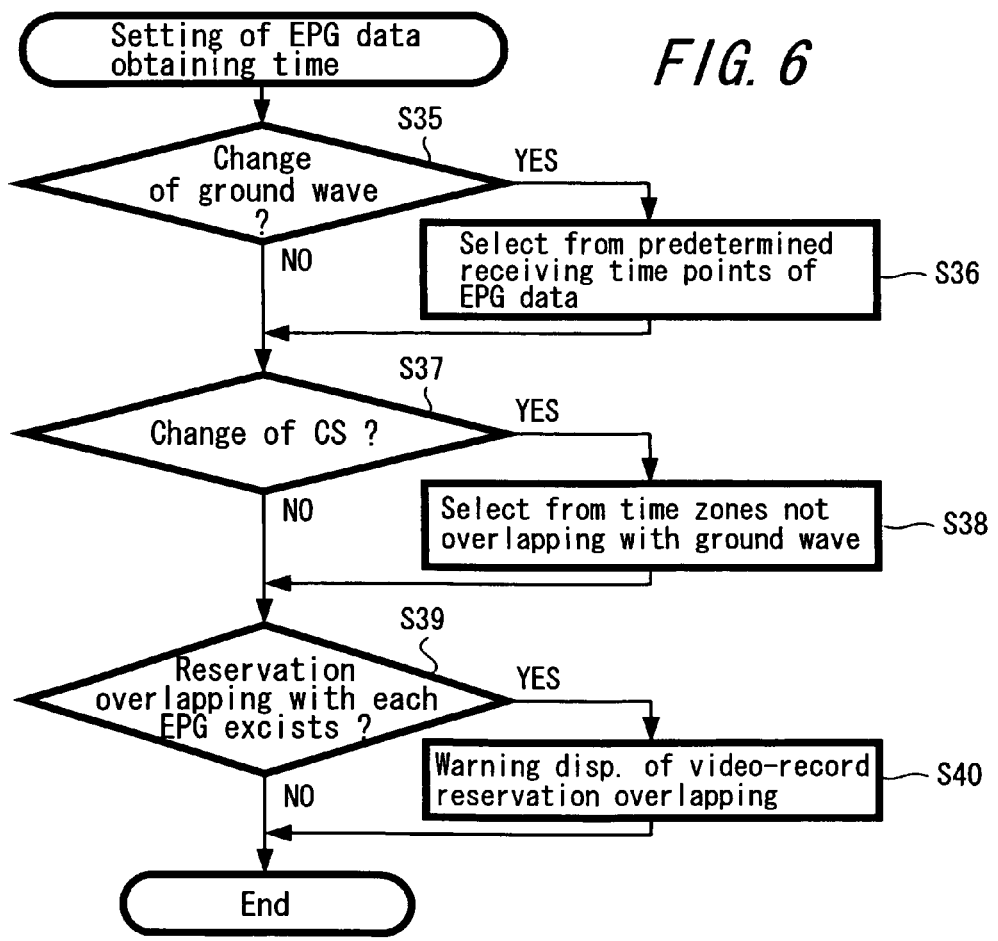
FIG. 6 is a flowchart showing a time set processing example for obtaining EPG data according to one exemplified example of the present invention.

Next, a processing example in the controller 121 when performing the time setting for obtaining the EPG data which display the electronic program table will be explained with reference to a flowchart shown in FIG. 6. First, it is judged whether or not it is an operation of changing the time for obtaining the EPG data of the ground wave if there is a changing operation of the time for obtaining the EPG data (step S35). Here, in a case when it is a change of the time for obtaining the EPG data of the ground wave, only the multiple time points at which EPG data are determined beforehand to be transmitted will be displayed as candidates so as to select either one of the candidate time points (step S36). For example, only the starting time points for obtaining the EPG data are made to be displayed on the setting picture screen, but actually a relatively long time is necessary for obtaining the EPG data. Then, it is judged next whether or not it is an operation for changing the obtaining time of the EPG data of the CS channel (step S37). In a case when changing the obtaining time of the EPG data of the CS channel, time points which become a plurality of candidates are displayed from the time zones which do not overlap with the time zones for obtaining the EPG data of the ground wave and it is designed such that either one can be selected from the candidate time points (step S38).

Then, after the setting of the obtaining time of the EPG data is performed until this stage, it is judged whether or not there exists a video-record reservation which has a time overlapping with the obtaining time zone which was set at that time (step S39). Here, if there exists a video-record reservation overlapping with the obtaining time thereof, a warning display for designating that the video-record reservation is overlapping is carried out by superimposing on the setup picture screen at that time (step S40). It is possible to carrying out the warning display according to an acceptance of users. If it is authorized, the video-record reservation will be cancelled (step S55). If it is not authorized, the flow returns to step S35. It should be noted that if the authorization is refused to be accepted, the flow proceeds to step S55 directly.

Users who confirmed that the video-record reservation overlaps with the obtaining time zone of the EPG data by means of the warning display can avoid an inconvenience of not operating correctly by changing the obtaining time of the EPG data or by changing the time for the video-record reservation.

Next, it will be explained about a process for obtaining the EPG data actually after the setup is completed in this manner in the hard disk recording and reproducing apparatus 100. First, a process for obtaining the EPG data of the ground wave under the control of the controller 121 will be explained with reference to a flowchart of FIG. 7.

The controller 121 judges whether or not it becomes the time point for obtaining the EPG data of the ground wave by means of the time counted by the clock unit 124 (step S41) and waits until it becomes the time for obtaining the EPG data of the ground wave. Then, if it is judged that it becomes the time for obtaining the EPG data of the ground wave, the channel which was registered beforehand for obtaining the EPG data of the ground wave is made to be received by the tuner 101 (step S42). The obtaining of the EPG data is performed by that receiving (step S43). It is judged whether or not one unit of EPG data are all obtained after the obtaining process starts (step S44) and it is continued until the obtaining is completed. According to the case of this example, data of electronic program tables from the current day until one-weak after are obtain with respect to all channels (but excluding partial channels without EPG data) broadcasted in that area.

Then, if all of the one unit of EPG data are obtained, the obtained EPG data are saved in the hard disk (step S45). It should be noted that it is possible to save in the hard disk sequentially in concurrent operation of obtaining data.

Then, an organizing process for making the EPG data saved in the hard disk into a data structure which can be utilized easily in the recording and reproducing apparatus 100 (step S46) and the data obtaining process of the ground wave is finished.

Figure 7:
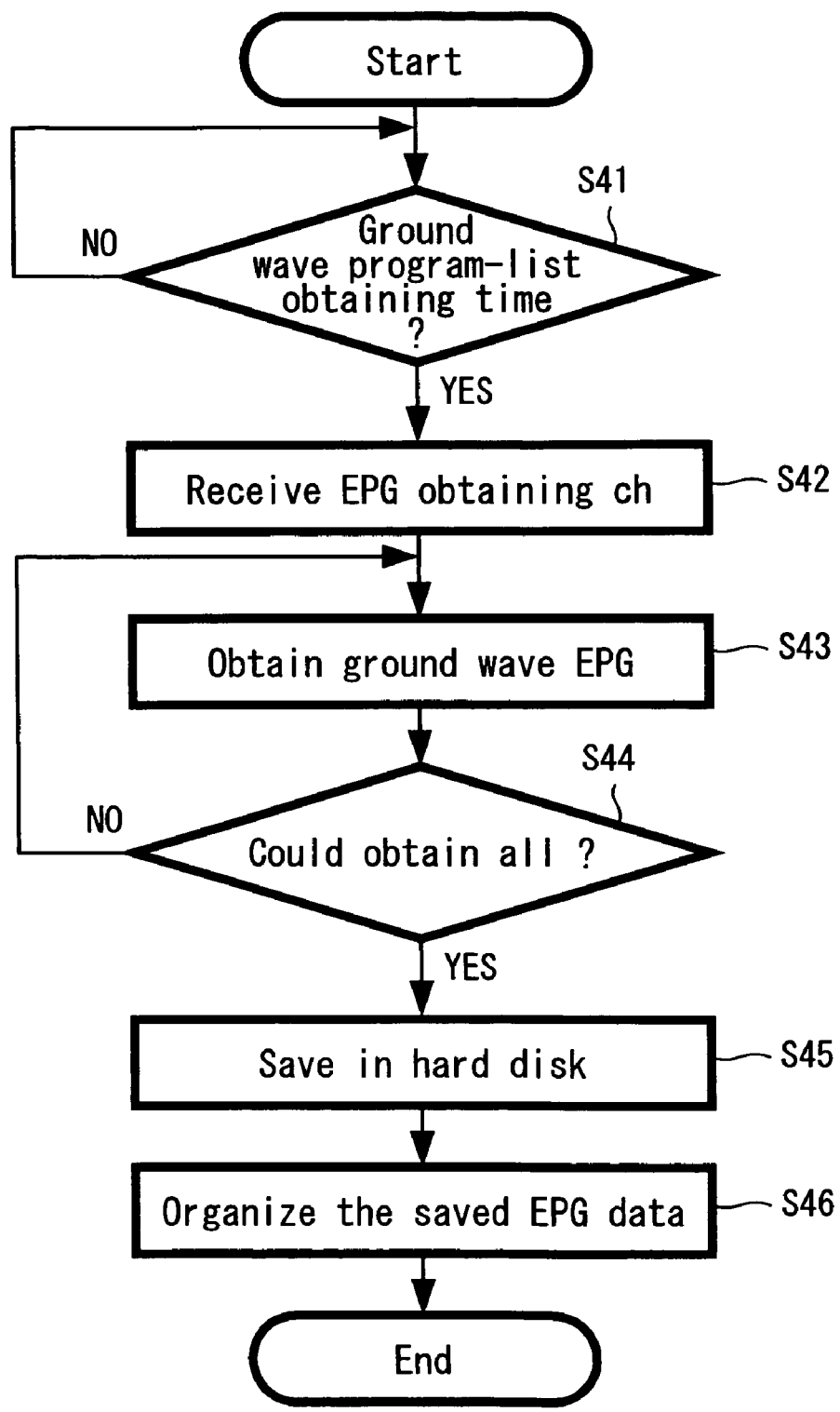
FIG. 7 is a flowchart showing a processing example for obtaining a program table of a ground wave according to one exemplified example of the present invention.

It should be noted that the EPG data obtaining process shown in the flowchart of FIG. 7 is a process for obtaining the EPG data added to the broadcast data of the ground wave, but other than this, the hard disk recording and reproducing apparatus 100 of this example is constituted to be able to be connected to the internet such that it is also possible to access a predetermined server by way of the internet and to store up the EPG data transmitted from the server. It is possible to execute the video-record reservation and the like similarly as described hereinafter regardless of the EPG data obtained by way of the internet or the EPG data picked up from the broadcast wave. However, detailed program guide information is necessary in order to perform a keyword search as described hereinafter and it is preferable to utilize the EPG data composed of more detailed data.

Figure 8:
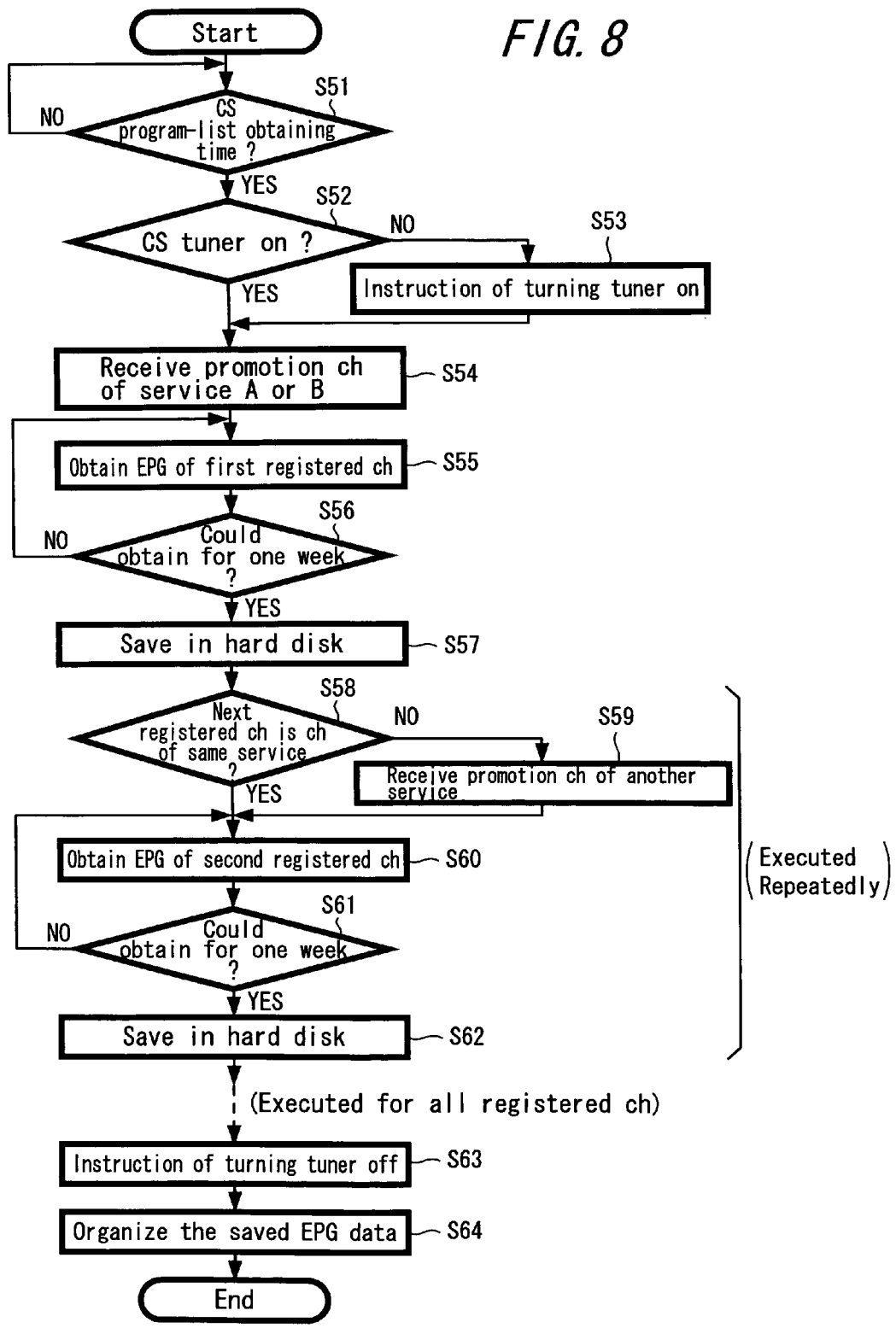
FIG. 8 is a flowchart showing a processing example for obtaining a program table of a CS broadcast according to one exemplified example of the present invention.

Next, a process for obtaining the EPG data of the CS broadcast under the control of the controller 121 will be explained with reference to a flowchart of FIG. 8.

The controller 121 judges whether or not it becomes the time point for obtaining the EPG data of the CS broadcast based on the time counted by the clock unit 124 (step S51) and waits until the time for obtaining the EPG data of the CS broadcast. Then, when it judges that it becomes the time point for obtaining the EPG data of the CS broadcast, it judges whether or not the power supply of the connected CS tuner apparatus 200 is on at present (step S52), and if the power supply of the CS tuner apparatus 200 is not an on-state, it transmits an instruction for turning on the tuner to the CS tuner apparatus 200 (step S53). It should be noted that if the state of the CS tuner apparatus 200 can be detected by the communication with the CS tuner apparatus 200 with respect to the judgment about the power-on state in step S52, it is allowed to perform the detecting process thereby. Also, if the state of the CS tuner apparatus 200 cannot be detected, it is judged as a power-on state in a case when received data and the like are supplied from the CS tuner apparatus 200 at present and judged as not a power-on state in a case when received data are supplied. Further, processes in step S52 and S53 are not necessary if the power supply of the CS tuner apparatus 200 is set as non-cooperation.

Then, after it is judged in step S52 that the power supply is on and an instruction for turning on the power supply is transmitted in step S53, an instruction of changing-over the channel for receiving the promotional channel of the service A or the service B which was registered beforehand (step S54). The received service here is a service which a channel whose channel number is the smallest belongs to supposing that, for example, the registered receiving channels are to be received sequentially from the channel whose channel number is the smallest. Here, it will be explained hereinafter supposing that the receiving is done by a channel number order. Here, in a case when a CS tuner in which a satellite changing-over operation is necessary is connected, it is necessary to transmit a channel changing-over instruction after a satellite changing-over instruction is transmitted compulsorily to a desired satellite. It should be noted that if satellite information when the satellite changing-over instruction was performed previous time is stored in a memory or the like connected to the controller 121, it is possible to transmit the satellite changing-over instruction only when it is judged that the satellite changing-over is necessary according to that information.

Consequently, a process for obtaining the EPG data with respect to the channel whose channel number is the smallest is performed (step S55) and it is judged whether or not the electronic program table data from the current day until one-weak after could be obtain with respect to that channel number (step S56). In order to obtain electronic program table data for one week with respect to one channel, approximately one minute, for example, is necessary and an obtaining process is performed in step S55 until electronic program table data for one week with respect to the corresponding channel can be obtained. If the electronic program table data for one week with respect to the corresponding channel could be obtained, the EPG data for one week are saved in the hard disk (step S57).

Then, it is judged next whether or not a next smaller channel number in the registered receiving channels corresponds to the same channel of the broadcast service as the channel number which obtained the EPG data just before (step S58), and if it is a different broadcast service, it is made to be changed over to the receiving of a promotional channel of another broadcast service (step S59). Here, in a case when a CS tuner in which a satellite changing-over operation is necessary is connected, it is necessary to transmit the channel changing-over instruction after the satellite changing-over instruction is transmitted.

Then, if it is judged in step S58 that it is the same broadcast service and after the process in step S59 is performed, a process for obtaining the EPG data with respect to the channel to be obtained at that time (step S60), and it is judged whether or not the electronic program table data from the current day until one-weak after could be obtained with respect to the channel number (step S61). If the electronic program table data for one week could be obtain with respect to the corresponding channel, the EPG data for one week are made to be saved in the hard disk (step S62).

The processes from step S58 to step S62 are performed repeatedly so long as there is a channel which is registered to be received. According to this example, the number of channels of the CS broadcast which can be registered is maximum 20 channels, so that maximum 20 times of EPG data obtaining processes are performed. If the EPG data with respect to all channels registered could be obtained and could be saved in the hard disk, an instruction for turning the power supply off is transmitted to the CS tuner apparatus 200 (step S63) and the CS tuner apparatus 200 is made to be a standby state. However, the process in step S63 is not necessary if the power supply of the CS tuner apparatus 200 is set as non-cooperation.

Thereafter, a data organizing process is performed for forming the EPG data saved in the hard disk as data which are easily utilized in the hard disk recording and reproducing apparatus 100 (step S64) and the EPG data obtaining process of the CS broadcast here is finished. Supposing that approximately one minute is necessary for obtaining the EPG data with respect to one CS channel, approximately maximum 20 minutes are necessary for the reception, because it is possible to register maximum 20 channels and thereafter, for example, approximately 10 minutes are necessary for the data organization in step S64, so that a duration of approximately total 30 minutes becomes necessary.

In this manner, the program list is to be displayed on a connected television receiver or the like according to the saved EPG data by being able to save EPG data on the hard disk recording and reproducing apparatus 100 and a program which is reserved for a picture recording can be easily selected by carrying out an operation for selecting a program to be picture-recorded from a program list displayed according to a GUI operation or the like. Also, it is constituted when it is not a picture-recording reservation according to these kinds of EPG data and when merely a picture recording start operation of a user or the like is carried out and broadcast data of any one of receiving channels was picture-recorded such that a process making reference to the EPG data is to be carried out.

Figure 9:
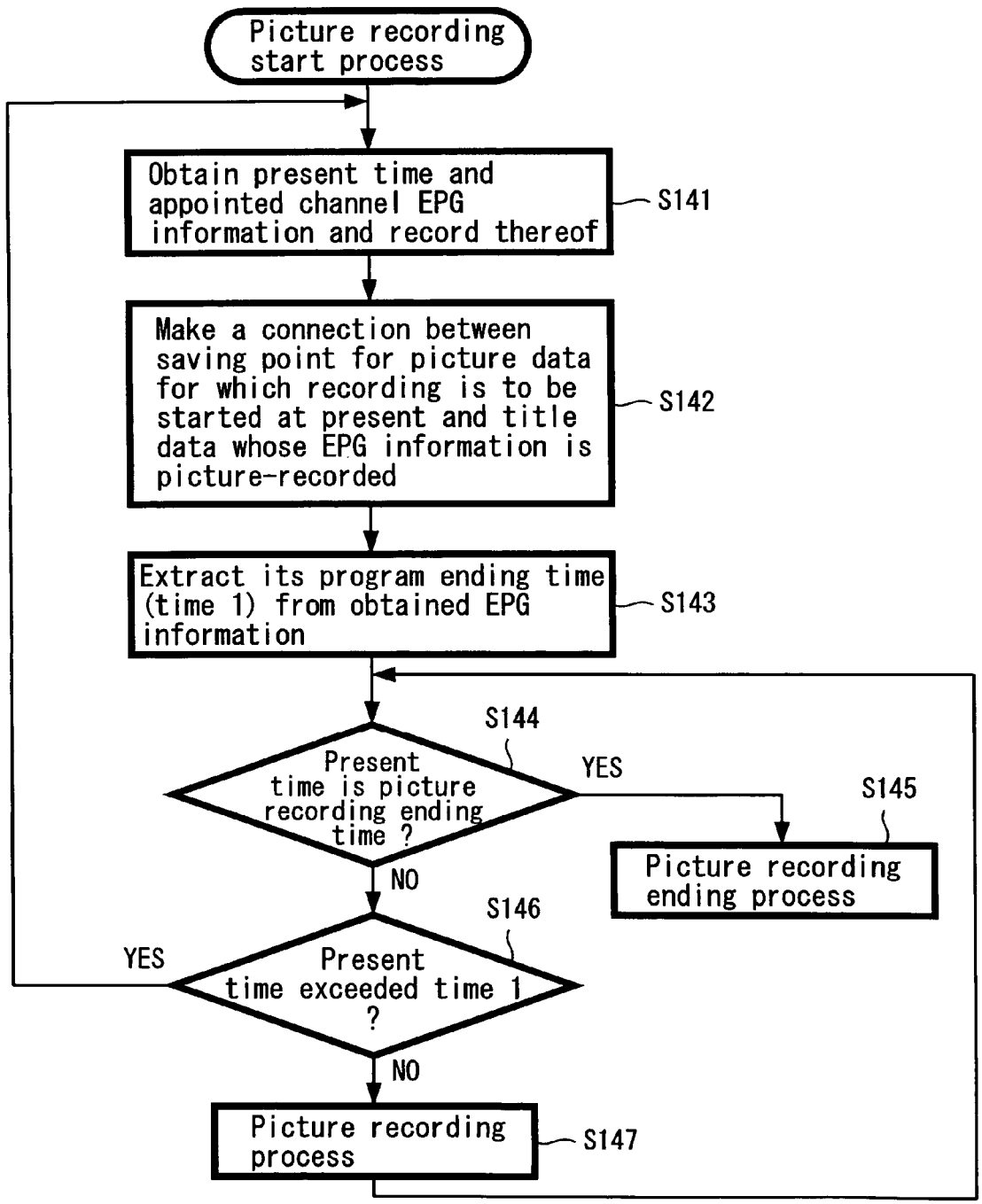
FIG. 9 is a flowchart showing a video-record processing example according to one exemplified example of the present invention.

Next, a process when a ground wave broadcast signal received by the built-in tuner 101 or a CS broadcast signal received by the connected CS tuner 200 is picture-recorded on the hard disk recording and reproducing apparatus 100 of this example will be explained with reference to a flowchart of FIG. 9. Here, it is assumed that there is a picture recording reservation for carrying out picture recording of a specific ground wave broadcast channel or CS broadcast channel during a period from a start time to an ending time which was appointed, for example, by a user according to the user's operation, that picture recording reservation time approaches, and a picture recording start process began.

At that time, the controller 121 of the recording and reproducing apparatus 100 judges the channel which is picture-recorded at present and extracts EPG data relating to that channel from the EPG data obtained and accumulated in the above described processes (step S141). Then, a recording position saving pointer of picture data for the program which is presently started for being recorded and prepared EPG data are made a connection with title data of a program to be picture-recorded (step S142). Next, ending time (time 1) of the program which is presently started for being recorded is extracted according to the EPG data (step S143), it is judged whether or not the present time counted by the clock unit 124 became the ending time (step S144) and in a case when it is not the ending time, the flow is shifted to step S146 and it is judged whether or not the present time exceeded the program ending time (time 1). Here, in a case when the program ending time is not exceeded, a picture recording process is executed and a picture recording of broadcast data (picture data and sound data of a program or the like) of the corresponding channel onto the hard disk 105 starts (step S147). It should be noted that it is recorded concurrently also with respect to the EPG data of the program during the recording, which were obtained in step S141.

Then, when the picture recording process is carried out, the flow returns to the judgment of step S144 whether or not it is the ending time. In a case when it is judged in step S144 that it became the ending time, an ending process for stopping the picture recording is carried out (step S145). Also, in a case when the present time exceeds the program ending time (time 1) in step S146, the flow returns to step S141, EPG data of a next program are extracted, and the processes in steps S142 and S143 are carried out according to the EPG data.

By carrying out the picture recording process in this manner, it happens that a pointer at the head of the recording position in the program data is to be recorded is made a connection with the program title at every program existing during the picture recording, so that it becomes possible to search the recorded programs easily when reproducing the picture-recorded program data.

Figure 10:
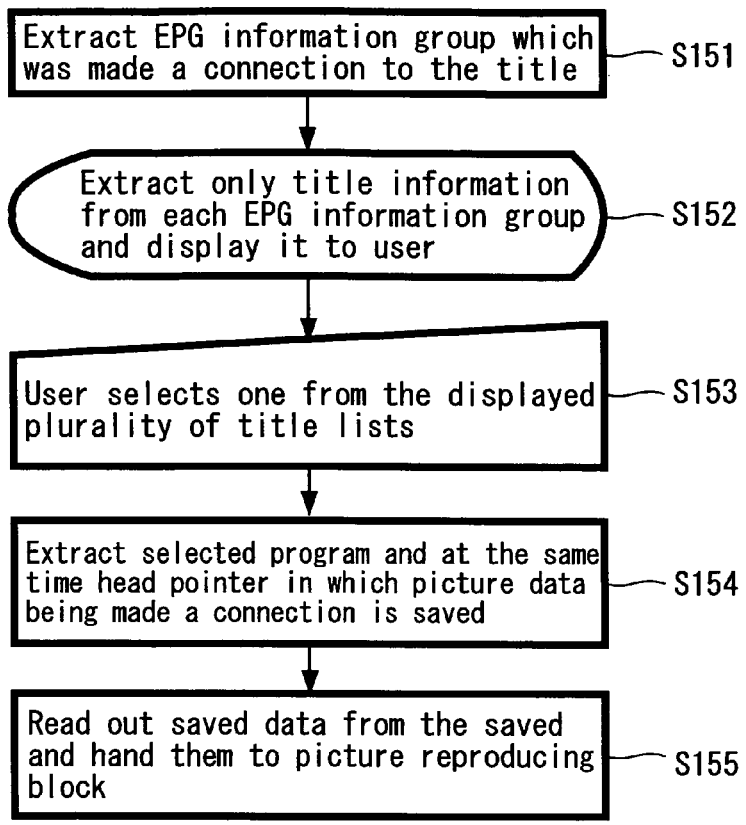
FIG. 10 is a flowchart showing a processing example of a reproduction list display according to one exemplified embodiment of the present invention.

Next, a process example when reproducing the program data (picture data, sound data or the like) picture-recorded in this manner is shown in a flowchart of FIG. 10. First, an EPG data group which is made a connection with the title is extracted (step S151). Next, only title information is extracted from each EPG data group and it is displayed on a picture screen of a television receiver 300 as a reproduction list (step S152). FIG. 19 is a diagram showing a display example of the reproduction list in this case. Here, it is made as an example in which date and hour of recording, channel number (or name of broadcast station) and a title list are displayed.

Then, a user selects a program desirable to be reproduced from the displayed title list (step S153). This selecting operation is carried out by using, for example, a remote control apparatus. Then, when a specific program is selected from the title list, the selected program and at the same time the head pointer which saves picture data being made a connection therewith or the like are extracted (step S154). Then, the saved data are read out from the hard disk 105 to the recording/reproducing process unit 103 according to the pointer, supplies it to the MPEG decoder 106, a reproducing process is carried out, and it is transmitted to the connected television receiver 300 or the like (step S155).

By carrying out the reproducing process in this manner, it becomes possible to reproduce the program selected in the reproduction list from the head thereof in a case when a plurality of programs were broadcasted during a time period of the picture recorded period.

Figure 20:
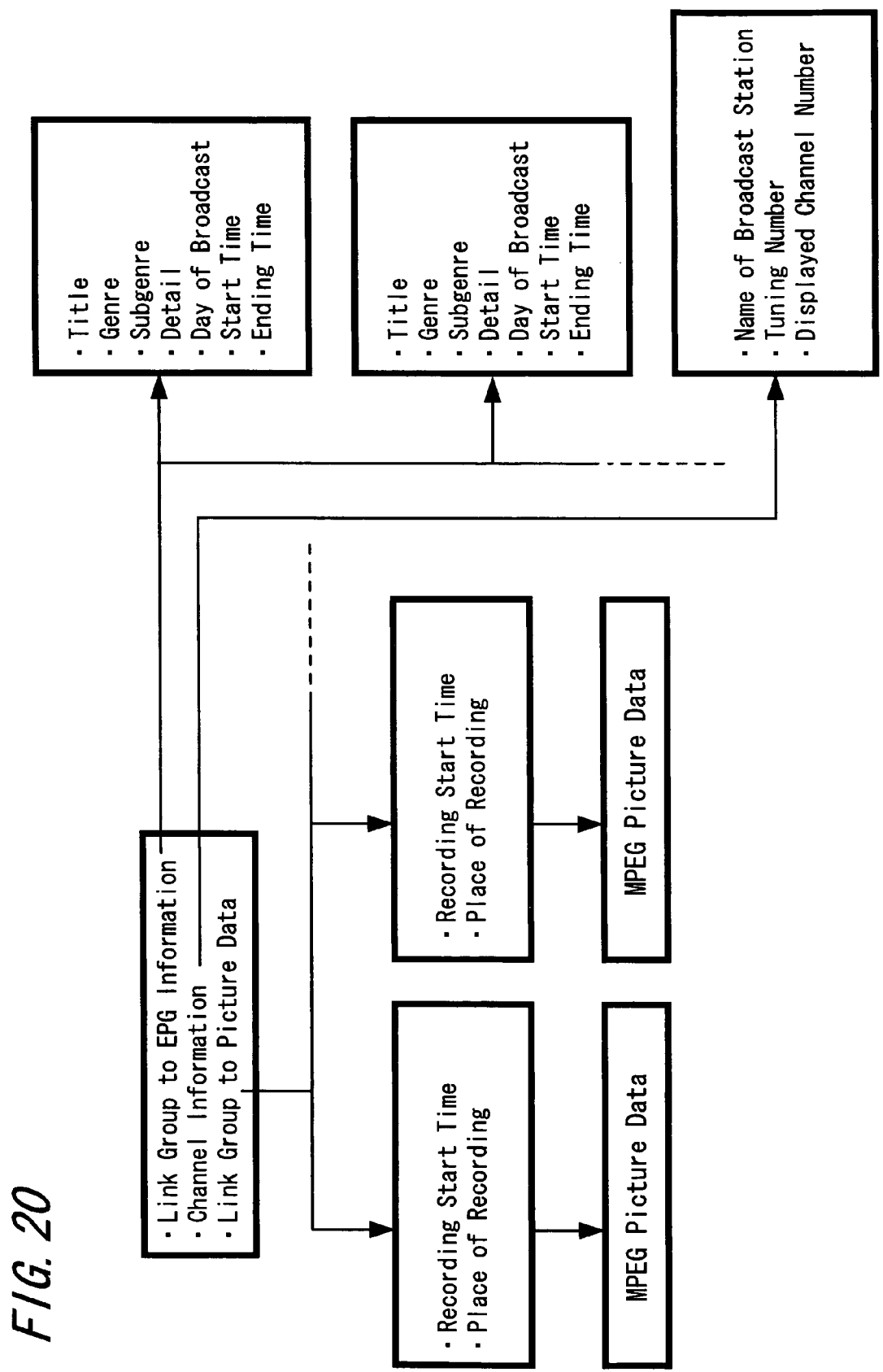
FIG. 20 is an explanatory diagram showing a data structure example (example 1) according to one exemplified embodiment of the present invention.

Here, a data structure example in a case when a picture recording is carried out in this manner is shown in FIG. 20. Here, picture data of the MPEG system are recorded as program data and the picture data of the MPEG system is to be recorded for each program by using a link group to the EPG data, channel information and a link group to the picture in a state in which the recording start time and the place of recording (pointer) of each program are shown. The EPG data and the channel information here are data downloaded after receiving the broadcast signal. For example, title, genre, sub-genre, detailed explanation of the program, day of broadcast, start time, ending time and the like are obtained with respect to the EPG data and they are to be recorded. Data of the group of the title or the like are made as a list and a process for showing it to users is carried out. With respect to the channel information, there are the name of broadcast station of the channel number, the tuning number, the channel number to be displayed and the like. Then, the recording start time, the place of recording and the like are obtained as the link group to the picture data and the picture data is to be specified. Here, a process for reproducing is carried out in this example wherein the start time is extracted from the title name the user selected, the recording start time is searched from the link group to the picture data, the place corresponding to the time is searched and the picture data are specified.

Figure 21:
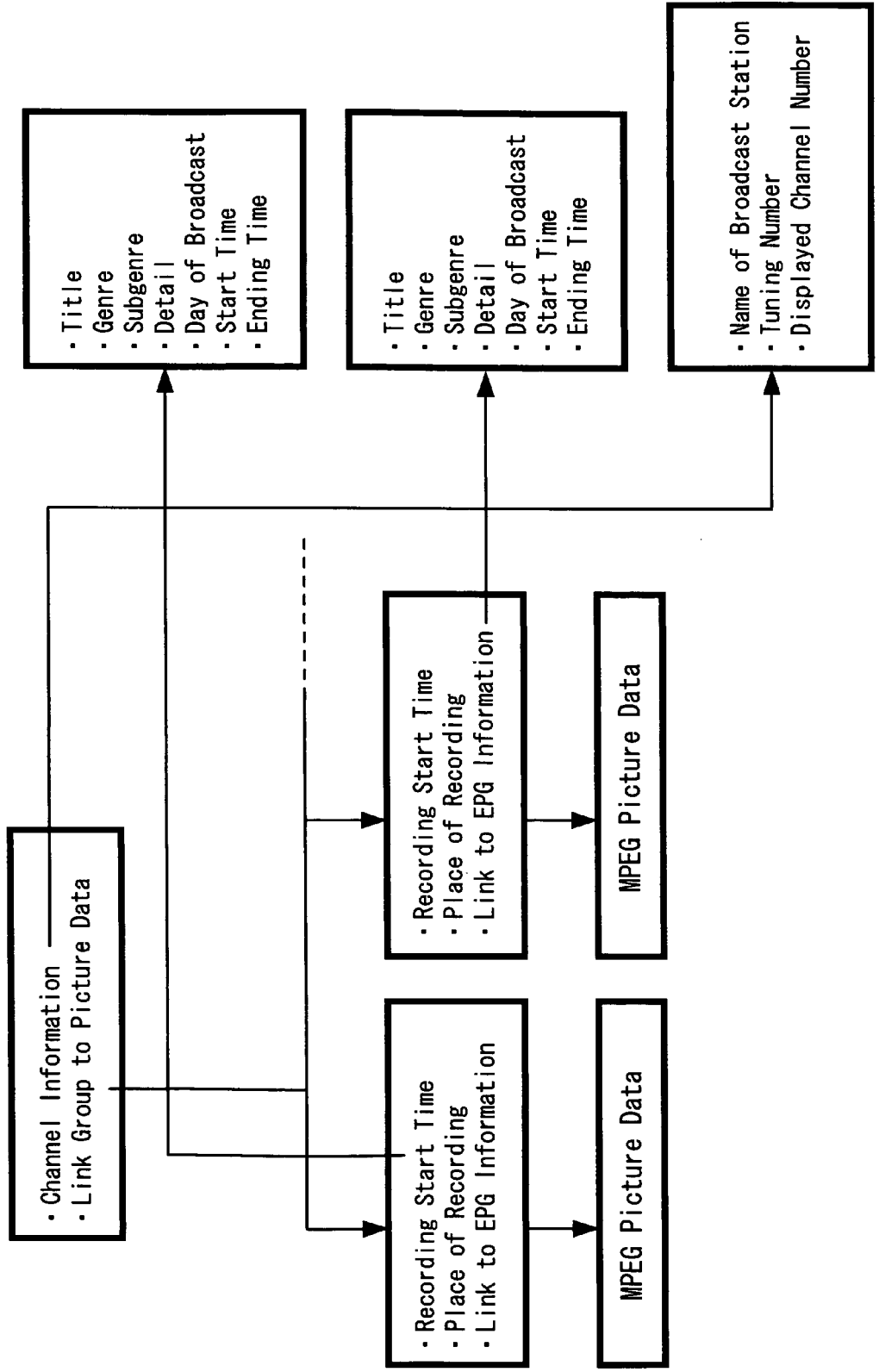
FIG. 21 is an explanatory diagram showing a data structure example (example 2) according to one exemplified embodiment of the present invention.

With respect to the EPG data used here, it is possible to obtain them by the process in the flowchart of FIG. 7 or the like and to use the EPG data themselves recorded on the hard disk 105 directly, but it is also possible to record them on another place as data relating to the recorded picture data. Also, in the example of FIG. 20, the link group to the EPG data is provided for operating in a lump, but it is also possible, for example, as shown in FIG. 21 to provide the link group to the EPG data for each program separately.

It should be noted that it is constituted in the reproducing process shown in the flowchart of FIG. 10 such that a title list is displayed and a program to be reproduced is selected therefrom, but it may also be constituted such that a program can be selected without displaying the title list. For example, it may also be constituted in a case when reproducing the data recorded is selected at that time such that the reproduction position of each program can be selected depending on the number of times of pushing down a reproduction button or a skip button by reproducing from the head position of the first program when the reproduction button is pushed down first, by reproducing from the head position of the next program when the skip button is pushed down in that state and further by reproducing from the head position of a further next program when the skip button is pushed down once more. In this case, it is also possible to display the title obtained from the EPG data in the picture reproduced from the head position of each program by using a superimpose technique or the like.

It should be noted in the exemplified embodiments described above that examples in which the invention is applied to a recording and reproducing apparatus using a hard disk as a recording medium are adopted, but it is also possible to apply it to a recording apparatus using one of other various recording (storing) media. For example, it is also applicable in a case when picture data of the broadcast program or the like are recorded on a disc such as a DVD (Digital Video Disc or Digital Versatile Disc) or the like. In case of recording on that disc, it is only necessary to set a pointer (chapter or the like) at a head position of each program separately such that the reproduction can be executed from the position thereof.

Also in the exemplified examples mentioned above, with respect to the tuner installed in the recording and reproducing apparatus, a tuner for receiving a television broadcast of an analog ground wave is used in the exemplified examples mentioned above, but it is possible to use a tuner of another receiving form such as, for example, a tuner receiving a digital ground wave. Also, a tuner for performing the reception of the CS broadcast was constituted as a separate body from the recording apparatus, but it is possible to constitute a tuner which receives other channels than those of the built-in tuner for receiving the CS broadcast or the like as a one-body configuration with the recording apparatus such as a hard disk recording apparatus. It is possible also with respect to the tuner for receiving the CS broadcast to use a tuner for receiving another broadcast system such as the BS broadcast. Alternatively, it is possible to use a tuner for receiving both of the CS broadcast and the BS broadcast.

Also in the exemplified examples mentioned above, the video signal and the audio signal which were converted to analog signals were made to be transmitted between the separately provided tuner and the recording and reproducing apparatus, but it is possible to transmit digital video data or audio data received by the tuner directly to the recording and reproducing apparatus to be recorded therein.

Also in the exemplified examples mentioned above, it was constituted such that a separately provided television receiver is connected to a recording and reproducing apparatus, but it is possible to install a recording and reproducing apparatus of a processing constitution such as this example within the receiver.

Further, departing from preparing the exclusive tuner and the recording apparatus such as the example mentioned above, it is possible to constitute, for example, such that a recording (storing) apparatus of a high-capacity which corresponds to the recording apparatus in this example is mounted (connected) on a personal computer equipment which performs various data processes and a tuner of a different body or the like is connected to that computer apparatus in order to perform similar video-record processes (record processes) by mounting a software (programs) for obtaining the EPG data and for performing the control of the recording process into the personal computer equipment.

Also in the exemplified examples mentioned above, it was explained as an example about a case where a general television broadcast is received and video-recorded, but it is needless to say that a similar process can be applied in a case when a recording of other broadcast data of, for example, a radio broadcast or one of various data broadcasts or the like is carried out in a recording apparatus separated from the receiving apparatus.

The invention claimed is:

1. A program data recording method for recording a received broadcast program comprising:
   receiving and storing guide information of programs transmitted from a plurality of content sources;
   extracting guide information of a content to be recorded from the stored guide information;
   setting a recording period based on the extracted guide information,
   wherein a plurality of contents are recorded during the recording period;
   setting one or more predetermined pointers at recording positions of time points when recording respective contents during the recording period is started; and
   recording said pointers so that said pointers are linked to said guide information.

2. The program data recording method according to claim 1, wherein recording programs are reproduced from said set positions of the respective pointers.

3. The program data recording method according to claim 2, wherein said guide information is recorded with the program data and displaying a recording program list according to the recorded guide information.

4. A program data recording apparatus comprising:
   receiving means for receiving a broadcast signal of a predetermined broadcast service, the receiving means receiving programs transmitted from a plurality of content sources;
   recording means for recording the broadcast signal received by said receiving means;
   guide information obtaining means for receiving and storing guide information of a content broadcasted by said broadcast service; and control means for extracting the guide information relating to the content which is being recorded by said recording means from said guide information obtaining means, for setting a recording period based on the extracted guide information, and for setting predetermined pointers at recording positions of time points when recording respective contents during the recording period is started, wherein a plurality of contents are recorded during the recording period.

5. The program data recording apparatus according to claim 4, wherein said control means controls reproducing recording programs from said set positions of the respective pointers when reproducing the programs recorded by said recording means.

6. The program data recording apparatus according to claim 5, wherein said recording means records the guide information of the program recorded at that time with the program data and said control means controls displaying of a recording program list according to the recorded guide information.

* * * * *

UNITED STATES PATENT AND TRADEMARK OFFICE
CERTIFICATE OF CORRECTION

PATENT NO. : 7,657,155 B2  Page 1 of 1
APPLICATION NO. : 10/570369
DATED : February 2, 2010
INVENTOR(S) : Korehisa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Twenty-eighth Day of December, 2010

David J. Kappos
*Director of the United States Patent and Trademark Office*